United States Patent
Yang et al.

(10) Patent No.: US 10,218,819 B2
(45) Date of Patent: Feb. 26, 2019

(54) APPARATUS AND METHOD FOR TRANSMITTING AND RECEIVING SIGNAL IN MULTIMEDIA SYSTEM

(71) Applicant: Samsung Electronics Co., Ltd., Suwon-si, Gyeonggi-do (KR)

(72) Inventors: Hyun-Koo Yang, Seoul (KR); Kyung-Mo Park, Seoul (KR); Young-Wan So, Gunpo-si (KR); Sung-Hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/251,489

(22) Filed: Aug. 30, 2016

(65) Prior Publication Data

US 2017/0064044 A1 Mar. 2, 2017

(30) Foreign Application Priority Data

Aug. 31, 2015 (KR) .................. 10-2015-0122808
Jan. 15, 2016 (KR) .................. 10-2016-0005354

(51) Int. Cl.
*H04L 12/28* (2006.01)
*H04L 29/06* (2006.01)
*H04L 12/721* (2013.01)
*H04L 29/08* (2006.01)

(52) U.S. Cl.
CPC ............ *H04L 69/08* (2013.01); *H04L 45/72* (2013.01); *H04L 69/04* (2013.01); *H04L 69/22* (2013.01); *H04L 69/324* (2013.01); *H04L 69/325* (2013.01)

(58) Field of Classification Search
CPC ......... H04L 69/08; H04L 45/72; H04L 69/04; H04L 69/22; H04L 69/324; H04L 69/325

USPC .......................................................... 370/392
See application file for complete search history.

(56) References Cited

U.S. PATENT DOCUMENTS

| | | | |
|---|---|---|---|
| 7,454,517 B2 * | 11/2008 | Ha ................ | H04L 12/2803 709/208 |
| 2008/0120081 A1 * | 5/2008 | Chandrashekar ... | H04L 41/0896 703/13 |
| 2013/0268689 A1 | 10/2013 | Leucht-Roth | |
| 2014/0247723 A1 | 9/2014 | Xiong et al. | |

(Continued)

FOREIGN PATENT DOCUMENTS

| | | |
|---|---|---|
| WO | 2015/046836 A1 | 4/2015 |
| WO | 2015/064942 A1 | 5/2015 |
| WO | 2015/108326 A1 | 7/2015 |

OTHER PUBLICATIONS

Crinon et al.; "The ATSC Data Broadcast Standard"; Nov. 4, 2000; pp. 59-62; ACM Multimedia Workshop; Del Ray CA, USA; XP058171756.

*Primary Examiner* — Sai Ming Chan
(74) *Attorney, Agent, or Firm* — Jefferson IP Law, LLP

(57) ABSTRACT

A transmitting apparatus and an operating method for the apparatus in a multimedia system are provided. The operating method includes inputting at least one network layer packet, generating a link layer packet based on the at least one network layer packet, and transmitting the link layer packet. The link layer packet includes a header including information indicating a packet type of the at least one network layer packet, information indicating whether the link layer packet includes a single network layer packet, and information indicating an identifier related to the at least one network layer packet.

17 Claims, 13 Drawing Sheets

(56) References Cited

U.S. PATENT DOCUMENTS

2015/0016265 A1 1/2015 Ahmadi
2016/0366368 A1* 12/2016 Kwon ...................... H04N 7/08

* cited by examiner

APPARATUS AND METHOD FOR TRANSMITTING AND RECEIVING SIGNAL IN MULTIMEDIA SYSTEM

CROSS-REFERENCE TO RELATED APPLICATION(S)

This application claims the benefit under 35 U.S.C. § 119(a) of a Korean patent application filed on Aug. 31, 2015 in the Korean Intellectual Property Office and assigned Serial number 10-2015-0122808, and of a Korean patent application filed on Jan. 15, 2016 in the Korean Intellectual Property Office and assigned Serial number 10-2016-0005354, the entire disclosures of each of which are hereby incorporated by reference.

TECHNICAL FIELD

The present disclosure relates to an apparatus and method for transmitting and receiving a signal in a multimedia system. More particularly, the present disclosure relates to an apparatus and method for transmitting and receiving a signal in a multimedia system supporting a link layer protocol.

BACKGROUND

Recently, various devices for broadcast services have been provided, so there is a need for a method of supporting various receiving schemes in the broadcast services.

Further, demand for data transport for various formats including a packet which is based on an Internet protocol (IP) as well as Moving Picture Experts Group phase 2 (MPEG 2)-transport stream (TS) packet transport.

Generally, a layer which is between a physical layer and an IP layer in a communication system is referred to as link layer, and a design for the link layer is optimized according to a type of a service provided by the communication system and a characteristic of the physical layer.

Therefore, there is a need for a scheme for optimizing a link layer protocol for a broadcast system by considering a characteristic of a physical layer of a broadcast network and a broadcast service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting and receiving a signal in a multimedia system.

Another aspect of the present disclosure is to provide an apparatus and method for transmitting and receiving a signal in a multimedia system supporting a link layer protocol.

Another aspect of the present disclosure is to provide an apparatus and method for transmitting and receiving information related to a sub-stream included in a link layer packet in a multimedia system supporting a link layer protocol.

Another aspect of the present disclosure is to provide an apparatus and method for transmitting and receiving information related to a link layer packet carrying a plurality of sub-streams in a multimedia system supporting a link layer protocol.

Another aspect of the present disclosure is to provide an apparatus and method for effectively transmitting and receiving various types of services in a multimedia system supporting a link layer protocol.

Another aspect of the present disclosure is to provide an apparatus and method for filtering a sub-stream in a link layer packet in a multimedia system supporting a link layer protocol.

In accordance with an aspect of the present disclosure, an operating method of a transmitting apparatus in a multimedia system is provided. The operating method includes inputting at least one network layer packet, generating a link layer packet based on the at least one network layer packet, and transmitting the link layer packet, wherein the link layer packet includes a header including information indicating a packet type of the at least one network layer packet, information indicating whether the link layer packet includes a single network layer packet, and information indicating an identifier related to the at least one network layer packet.

In accordance with another aspect of the present disclosure, an operating method of a transmitting apparatus in a multimedia system is provided. The operating method includes generating a link layer packet including a header including information related to a first session among a plurality of sessions if the plurality of sessions are included in a physical layer channel signal, and transmitting the link layer packet, wherein, if the plurality of sessions include Internet protocol (IP) sessions, the information related to the first session includes an identifier of the first session and a context identifier of an IP stream to which a header compression scheme is applied.

In accordance with another aspect of the present disclosure, a transmitting apparatus is provided. The transmitting apparatus includes at least one processor configured to input at least one network layer packet, and to generate a link layer packet based on the at least one network layer packet, and a transmitter configured to transmit the link layer packet, wherein the link layer packet includes a header including information indicating a packet type of the at least one network layer packet, information indicating whether the link layer packet includes a single network layer packet, and information indicating an identifier related to the at least one network layer packet.

In accordance with another aspect of the present disclosure, a transmitting apparatus in a multimedia system is provided. The transmitting apparatus includes at least one processor configured to generate a link layer packet including a header including information related to a first session among a plurality of sessions if the plurality of sessions are included in a physical layer channel signal, and a transmitter configured to transmit the link layer packet, wherein, if the plurality of sessions include IP sessions, the information related to the first session includes an identifier of the first session and a context identifier of an IP stream to which a header compression scheme is applied.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
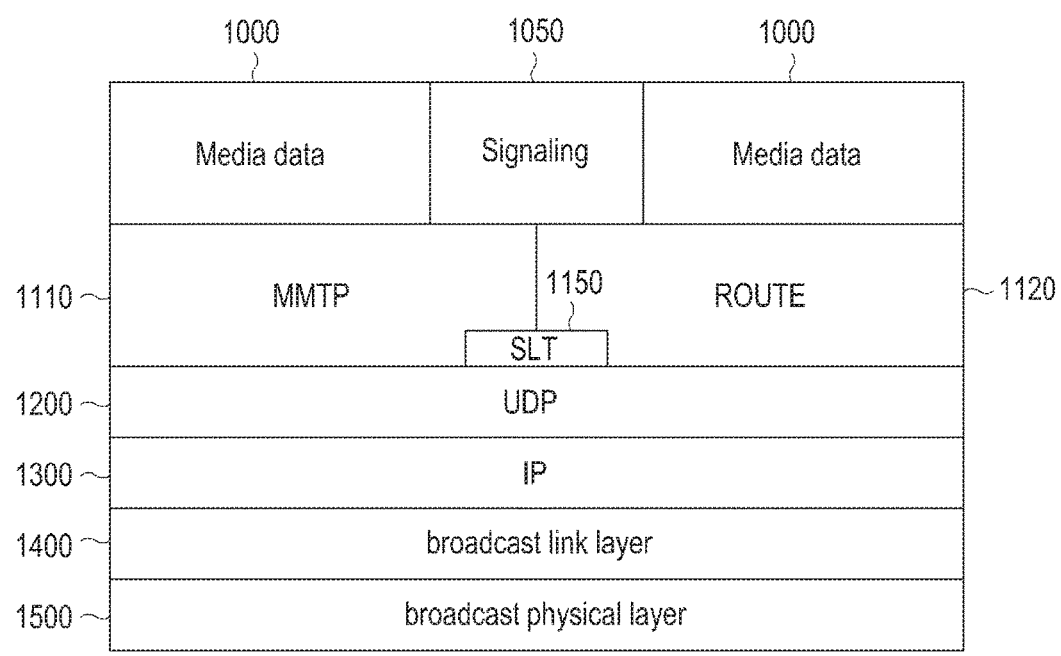
FIG. 1 schematically illustrates a system architecture of a multimedia system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the present disclosure. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 2 (MPEG-2) audio layer 3 (MP3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a terminal may be an electronic device.

According to various embodiments of the present disclosure, a transmitting apparatus may be a service provider or a terminal.

According to various embodiments of the present disclosure, a receiving apparatus may be a terminal or a service provider.

According to various embodiments of the present disclosure, a transmitting and receiving apparatus may be a terminal or a service provider.

In various embodiments of the present disclosure, it will be noted that the term terminal may be interchangeable with the term mobile station (MS), wireless terminal, mobile device, user equipment (UE), and/or the like.

An embodiment of the present disclosure proposes an apparatus and method for transmitting and receiving a signal in a multimedia system.

An embodiment of the present disclosure proposes an apparatus and method for transmitting and receiving a signal in a multimedia system supporting a link layer protocol.

An embodiment of the present disclosure proposes an apparatus and method for transmitting and receiving information related to a sub-stream included in a link layer packet in a multimedia system supporting a link layer protocol.

An embodiment of the present disclosure proposes an apparatus and method for transmitting and receiving information related to a link layer packet carrying a plurality of sub-streams in a multimedia system supporting a link layer protocol.

An embodiment of the present disclosure proposes an apparatus and method for effectively transmitting and receiving various types of services in a multimedia system supporting a link layer protocol.

An embodiment of the present disclosure proposes an apparatus and method for filtering a sub-stream in a link layer packet in a multimedia system supporting a link layer protocol.

An apparatus and method proposed in an embodiment of the present disclosure may be applied to various communication systems such as a digital video broadcasting system such as a mobile broadcasting service such as a digital multimedia broadcasting (DMB) service, a digital video broadcasting-handheld (DVB-H) service, an advanced television systems committee-mobile/handheld (ATSC-M/H) service, and the like, and an Internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an Institute of Electrical and Electronics Engineers (IEEE) mobile communication system, a mobile Internet protocol (mobile IP) system, and/or the like.

An apparatus and method proposed in an embodiment of the present disclosure may be applied to an advanced television systems committee (ATSC) system which is based on an MMT scheme.

For convenience, in various embodiments of the present disclosure, it will be assumed that a multimedia system is based on an MMT scheme.

A system architecture of a multimedia system according to an embodiment of the present disclosure will be described with reference to FIG. 1.

FIG. 1 schematically illustrates a system architecture of a multimedia system according to an embodiment of the present disclosure.

Referring to FIG. 1, a service includes media data 1000 and a signaling 1050 for transmitting information required for a receiving apparatus to acquire and consume the media data 1000. For example, the receiving apparatus may be a terminal. The media data 1000 may be encapsulated into a format suitable for transport. For example, an encapsulation scheme for the media data 1000 may follow a media processing unit (MPU) format defined in an International Organization for Standardization (ISO)/International Electrotechnical Committee (IEC) 23008-1 MPEG media transport (MMT) protocol or a dynamic adaptive streaming over hypertext transfer protocol (MPEG-DASH) segment format defined in an ISO/IEC 23009-1 DASH.

The media data 1000 and the signaling 1050 are packetized by an application layer protocol.

A case that an MMT protocol (MMTP) 1110 defined in an MMT scheme and a real-time object delivery over unidirectional transport (ROUTE) protocol 1120 are used as the application layer protocol is illustrated in FIG. 1. At this time, in order for a receiving apparatus to know that a service is transported based on which application layer protocol, a method for informing information on an application layer protocol that the service is transported is required, independently from the application layer protocol.

A service list table (SLT) illustrated in FIG. 1 is a signaling scheme used for informing information on an application layer protocol that a service is transported, configures information on a service as a table format, and packetizes the table. An SLT will be described below, so a detailed description thereof will be omitted herein.

Referring to FIG. 1, a signaling including the packetized media data and the SLT 1150 is output to a broadcast link layer 1400 after passing a user datagram protocol (UDP)

1200 and an Internet protocol (IP) 1300. An example of a broadcast link layer may be an ATSC link-layer protocol (ALP) defined in ATSC 3.0. The ALP generates an ALP packet based on an input IP packet to output the ALP packet to a broadcast physical layer 1500.

It will be noted that the broadcast link layer 1400 may use an MPEG-2-transport stream (TS) packet or packetized data which has a general format as well as the IP packet including the media data or the signaling as input. At this time, signaling information required for controlling the broadcast link layer 1400 is output to the broadcast physical layer 1500. Here, a format of the signaling information is an ALP packet.

The broadcast physical layer 1500 generates a physical layer frame based on an input ALP packet, converts the physical layer frame into a radio signal, and transmits the radio signal. The broadcast physical layer 1500 has at least one signal processing path. An example of the signal processing path may be a physical layer pipe (PLP) defined in a digital video broadcasting (DVB)-terrestrial version 2 (DVB-T2) or ATSC 3.0, and all of one or more services or a part of a service may be mapped to the PLP. Here, all of the one or more services or the part of the service mapped to the PLP will be referred to as sub-stream.

A system architecture of a multimedia system according to an embodiment of the present disclosure has been described with reference to FIG. 1, and an architecture of a broadcast link layer of a multimedia system according to an embodiment of the present disclosure will be described with reference to FIG. 2.

Figure 2:
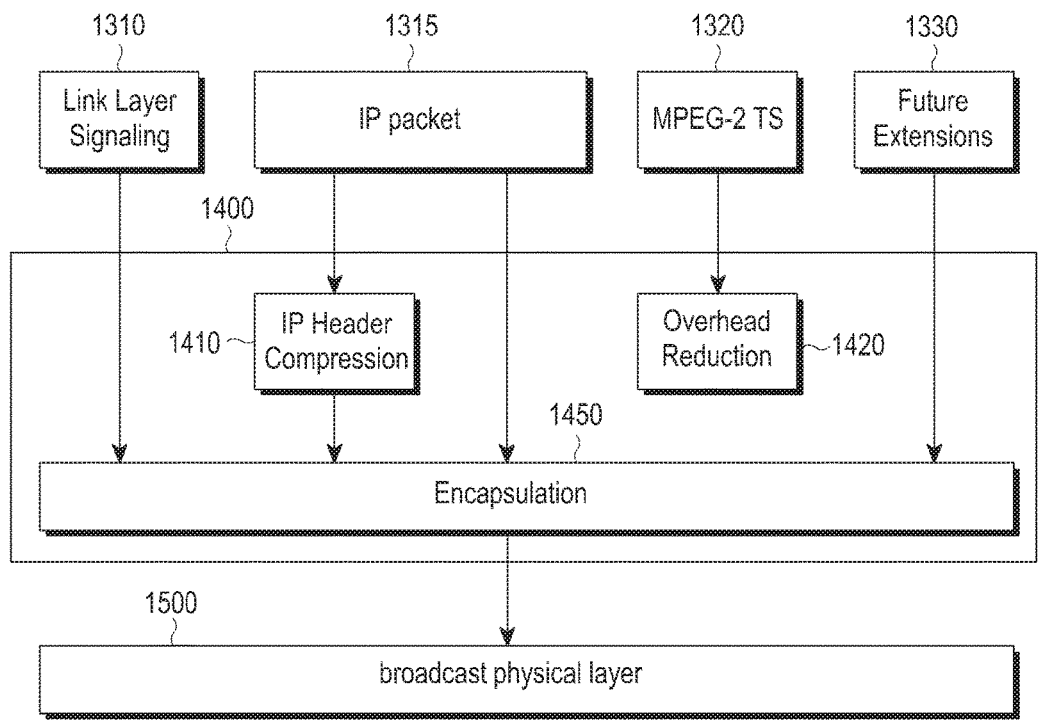
FIG. 2 schematically illustrates an architecture of a broadcast link layer of a multimedia system according to an embodiment of the present disclosure.

FIG. 2 schematically illustrates an architecture of a broadcast link layer of a multimedia system according to an embodiment of the present disclosure.

Referring to FIG. 2, input data of a broadcast link layer 1400 includes an IP packet 1315, and may further include a link layer signaling 1310, an MPEG-2-TS packet 1320, and one or more future extensions 1330. The future extension 1330 indicates other packet types which may be input at the broadcast link layer 1400, e.g., an ALP layer, and protocols. The input data may pass an additional processing process according to a type of the input data before an encapsulation process 1450. For example, if the input data is the IP packet 1315, the additional processing process may be an IP header compression process 1410. If the input data is the MPEG-2-TS packet 1320, the additional processing process may be an overhead reduction process 1420.

In the encapsulation process 1450, the input data may pass a segment process or a concatenation process.

After the encapsulation process 1450 has been completed, a link layer packet stream is generated, and the link layer packet stream is transferred to a broadcast physical layer 1500. Here, the link layer packet stream includes at least one link layer packet.

An architecture of a broadcast link layer of a multimedia system according to an embodiment of the present disclosure has been described with reference to FIG. 2, and a format of an ALP packet in a multimedia system according to an embodiment of the present disclosure will be described with reference to FIG. 3.

Figure 3:
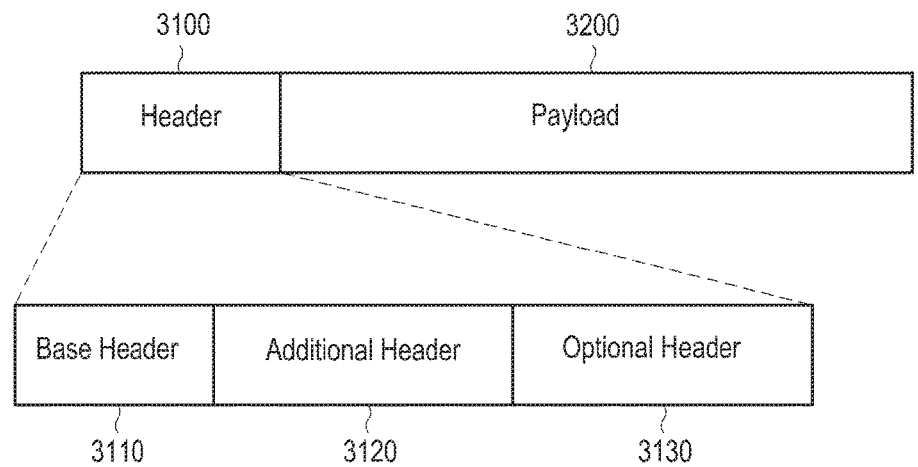
FIG. 3 schematically illustrates a format of an advanced television systems committee-mobile/handheld (ATSC) link-layer protocol (ALP) packet in a multimedia system according to an embodiment of the present disclosure.

FIG. 3 schematically illustrates a format of an ALP packet in a multimedia system according to an embodiment of the present disclosure.

Referring to FIG. 3, an ALP packet includes a header 3100 and a payload 3200.

The header 3100 may include a base header 3110, an additional header 3120, and an optional header 3130. Whether the additional header 3120 is included in the header 3100 may vary according to a value of a control value included in the base header 3110.

Whether to include the optional header 3130 into the ALP packet header 3100 may be selected using a control field included in the additional header 3120.

A format of an ALP packet in a multimedia system according to an embodiment of the present disclosure has been described with reference to FIG. 3, and a format of a base header included in an ALP packet in a multimedia system according to an embodiment of the present disclosure will be described with reference to FIG. 4.

Figure 4:
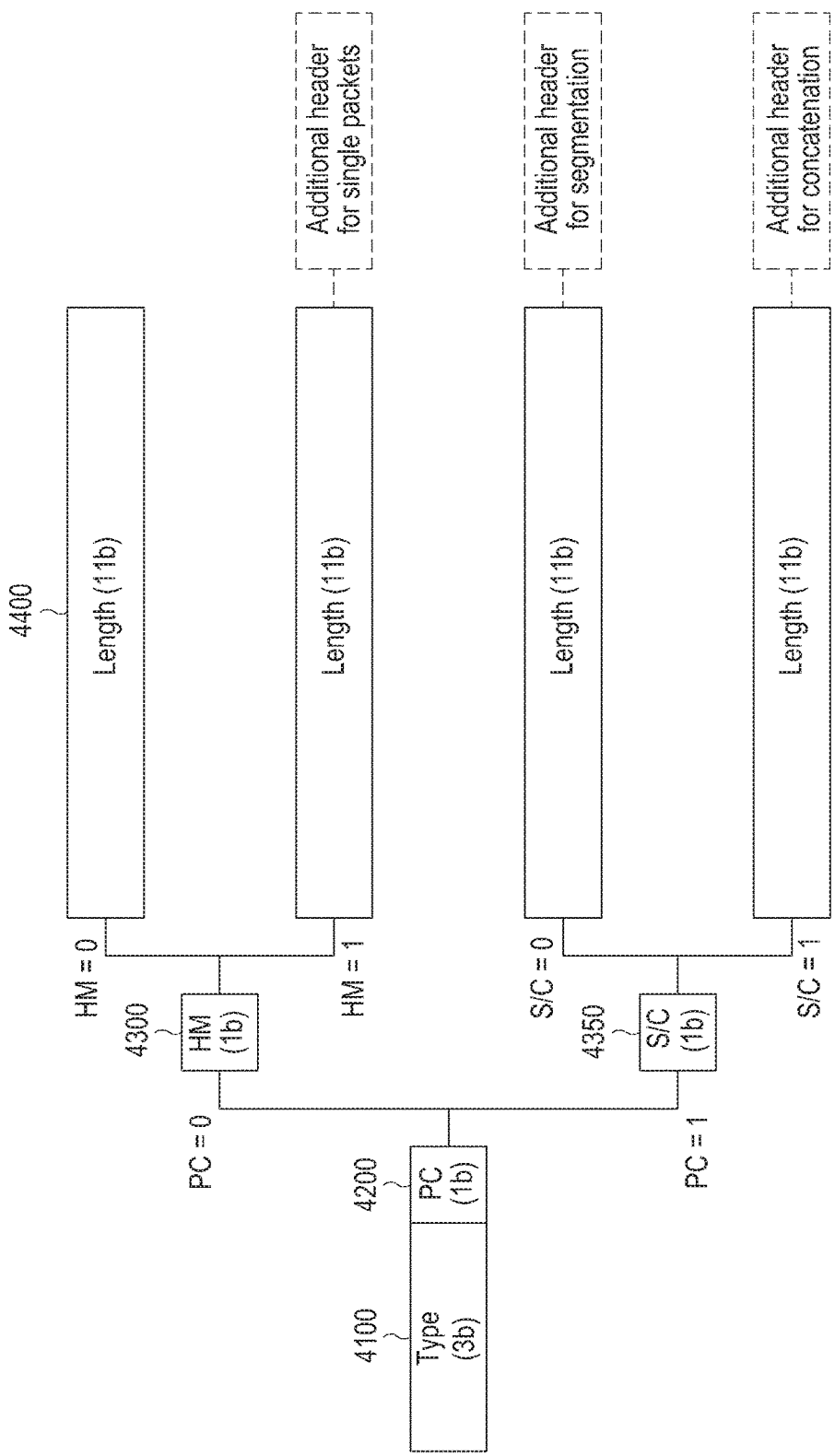
FIG. 4 schematically illustrates a format of a base header included in an ALP packet in a multimedia system according to an embodiment of the present disclosure.

FIG. 4 schematically illustrates a format of a base header included in an ALP packet in a multimedia system according to an embodiment of the present disclosure.

Referring to FIG. 4, a base header 3110 (shown in FIG. 3) includes a packet type (Packet_Type) field 4100. At this time, configuration for other fields may vary according to a value of the Packet_Type field 4100, and it will be noted that configuration of fields included in the base header 3110 is configuration of fields used in a case that an input packet is at least one of an IP version 4 (IPv4) packet, a compressed IP packet, a link layer signaling packet, and an extension packet.

The base header 3110 further includes a payload_configuration (PC) field 4200. A 1-bit field may be present after the PC field 4200, and meaning of the 1-bit field may vary according to a value of the PC field 4200.

For example, if the value of the PC field 4200 is 0, the 1-bit field which is present after the PC field 4200 may be a header mode (HM) field 4300, and the HM field 4300 indicates whether an additional header 3120 is present at an ALP packet 3100. For another example, if the value of the PC field 4200 is 1, the 1-bit field which is present after the PC field 4200 may be a segmentation/concatenation (S/C) field 4350, and the S/C field 4350 indicates whether the payload 3200 includes a plurality of input packets or a part of an input packet. Configuration of an additional header 3120 may vary according to a value of the S/C field 4350.

The base header 3110 includes a length field 4400 indicating least significant bit (LSB) 11 bits of a length of the payload 3200.

Meanwhile, a base header illustrated in FIG. 4 may be expressed as Table 1.

TABLE 1

| Syntax | Number of bits | Mnemonic |
|---|---|---|
| ALP_Packet_Header( ){ | | |
|   Packet_Type | 3 | uimsbf |
|   Payload_Configuration | 1 | bslbf |
|   if (Payload_Configuration =="0"){ | | |
|     Header_Mode | 1 | bslbf |
|     Length | 11 | uimsbf |
|     if (Header_Mode =="1"){ | | |
|       Additional_Header_for_Single_Packet( ) | var | |
|     } | | |
|   } | | |
|   else if (Payload_Config =="1"){ | | |
|     Segmentation_Concatenation | 1 | bslbf |
|     Length | 11 | uimsbf |
|     if (Segmentation_Concatenation =="0"){ | | |
|       Additional_Header_for_Segmentation( ) | var | |
|     } | | |
|     else if (Segmentation_Concatenation =="1"){ | | |
|       Additional_Header_for_Concatenation( ) | var | |
|     } | | |
|   } | | |
| } | | |

In Table 1, a Packet_Type field indicates a protocol or a packet type of an input packet before being encapsulated into an ALP packet. For example, the Packet_Type field may be implemented with a 3-bit field.

A value of the Packet_Type field may have meaning as shown in Table 2.

TABLE 2

| Packet_Type Value | Meaning |
| --- | --- |
| 000 | IPv4 packet |
| 001 | Compressed IP packet |
| 010 | MPEG-2 Transport Stream |
| 011 | Reserved |
| 100 | Link layer signaling packet |
| 101 | Reserved |
| 110 | Reserved |
| 111 | Packet Type Extension |

For example, in Table 2, if a value of the Packet_Type field is '000', it means that a packet type is an IPv4 packet, if a value of the Packet_Type field is '001', it means that a packet type is a compressed IP packet, if a value of the Packet_Type field is '010', it means that a packet type is an MPEG-2 Transport Stream (TS), if a value of the Packet_Type field is '011', it means that the Packet_Type field is reserved for future use, if a value of the Packet_Type field is '100', it means that an input packet is a link layer signaling packet, if a value of the Packet_Type field is '100' or '110', it means that the Packet_Type field is reserved for future use, and if a value of the Packet_Type field is '111', it means that an input packet is an packet type extension.

In Table 1, for example, a Payload_Configuration field may correspond to a PC field 4200, and indicates configuration of a payload, e.g., a payload 3200. For example, the Payload_Configuration field may be implemented with a 1-bit field. For example, if a value of the Payload_Configuration field, e.g., the PC field 4200 is 0, the payload 3200 includes only one whole input packet, and an HM field 4300 is present after the PC field 4200. For another example, if the value of the PC field 4200 is 1, the payload 3200 may include a plurality of whole input packets or a part of one input packet, and an S/C field 4350 is present after the PC field 4200.

In Table 1, a Header_Mode field indicates whether an additional header is present. For example, the Header_Mode field may be implemented with a 1-bit field. If a value of the Header_Mode field, e.g., an HM field 4300 is 0, it means that there is no additional header, and it means that a length of a payload 3200 is less than a preset length, e.g., 2048 bytes. If a value of the HM field 4300 is 1, it means that an additional header is present after a Length field 4400, and the length of the payload 3200 is greater than 2047 bytes or an optional header 3130 including a sub-stream identifier (SID) is present. The HM field 4300 may be present only if the value of the PC field 4200 is 0.

In Table 1, a Segmentation_Concatenation field indicates whether a payload, e.g., a payload 3200 includes a plurality of complete input packets or a part of an input packet. For example, the Segmentation_Concatenation field may be implemented with a 1-bit field. If a value of the Segmentation_Concatenation field, e.g., an S/C field 4350 is 0, the payload 3200 includes a part of one input packet, and includes an additional field 3120 defined for packet segment after a Length field 4400. If the value of the S/C field 4350 is 1, the payload 3200 includes a plurality of complete input packets, and includes an additional header 3120 defined for packet concatenation after the Length field 4400. The S/C field 4350 may be present only if the value of the PC field 4200 is 1.

In Table 1, a Length field indicates a length of a payload field, e.g., a payload 3200 (shown in FIG. 3). For example, the Length field indicates LSB 11 bits of a length in bytes of the payload 3200. If the additional header 3120 includes most significant bit (MSB) bits of the length in bytes of the payload 3200, the LSB 11 bits are combined with the MSB bits thereby indicating a total length of the payload 3200.

A format of a base header included in an ALP packet in a multimedia system according to an embodiment of the present disclosure has been described with reference to FIG. 4, and a format of an additional header in a case that a payload includes a single input packet in a multimedia system according to an embodiment of the present disclosure will be described with reference to FIG. 5.

Figure 5:
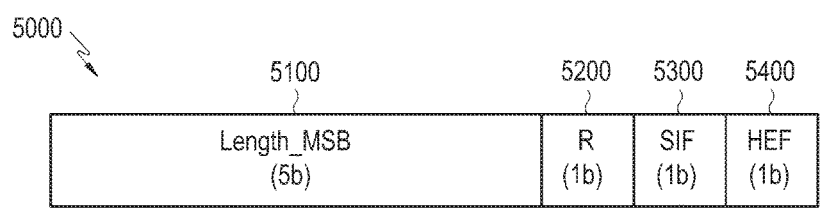
FIG. 5 schematically illustrates a format of an additional header in a case that a payload includes a single input packet in a multimedia system according to an embodiment of the present disclosure.

FIG. 5 schematically illustrates a format of an additional header in a case that a payload includes a single input packet in a multimedia system according to an embodiment of the present disclosure.

Referring to FIG. 5, it will be noted that a format of an additional header 5000 illustrated in FIG. 5 is a format of an additional header in a case that a payload, e.g., a payload 3200 includes a single input packet.

The additional header 5000 includes a Length_MSB field 5100 indicating MSB 5 bits in a case that a length in bytes of the payload 3200 is expressed with 16 bits, a reserved (R) field 5200, a sub-stream identifier flag (SIF) field 5300 indicating whether a sub-stream identifier is present, and a header extension flag (HEF) field 5400 indicating whether a header extension is present. For example, the R field 5200 may be implemented with a 1-bit field.

According to an embodiment of the present disclosure in FIG. 4, the additional header 5000 in FIG. 5 may be present only if the payload 3200 included in an ALP packet includes one complete packet, and a length of the one complete packet is greater than a preset length, e.g., 2047 bytes or an optional header is present. That is, the additional header 5000 may be present only if a value of a PC field 4200 is 0 and a value of an HM field 4300 is 1.

Meanwhile, the additional header 5000 in FIG. 5 may be expressed as Table 3.

TABLE 3

| Syntax | Number of bits | Mnemonic |
| --- | --- | --- |
| Additional_Header_for_Long_Packet ( ) { | | |
|     Length_MSB | 5 | uimsbf |
|     reserved | 1 | bslbf |
|     SIF | 1 | bslbf |
|     HEF | 1 | bslbf |
|     if (SIF =="1"){ | | |
|         SID | 8 | bslbf |
|     } | | |
|     if (HEF =="1"){ | | |
|         Header_Extension( ) | | var |
|     } | | |
| } | | |

In Table 3, a Length_MSB field indicates MSB 5 bits of a length in bytes of the payload 3200 if a length in bytes of a payload, e.g., the payload 3200 is expressed with 16 bits. The MSB 5 bits are combined with LSB 11 bits indicated by a Length field 4400 included in a base header 3110 thereby indicating a total length of the payload 3200.

In Table 3, an SIF field indicates whether a sub-stream identifier (SID) is present after an HEF field 5400. For example, the SIF field may be implemented with a 1-bit field. For example, if a value of the SIF field, e.g., an SIF field 5300 is 0, there is no SID field. If the value of the SIF field 5300 is 1, the SID field is present after the HEF field 5400.

In Table 3, an HEF field indicates whether a header extension is present after the additional header 5000. For example, the HEF field may be implemented with a 1-bit field. For example, if a value of an HEF field 5400 is 0, there is no header extension. If the value of the HEF field 5400 is 1, the header extension is present after the additional header 5000. In a case that the header extension is present, the header extension is present after the SID field if the SID field is present, and the header extension is present after the HEF field 5400 if there is no SID field.

In Table 3, an SID field indicates an SID for an ALP packet. Here, an SID may be a service identifier for each of a plurality of services at an ALP stream which carriers the plurality of services.

A format of an additional header in a case that a payload includes a single input packet in a multimedia system according to an embodiment of the present disclosure has been described with reference to FIG. 5, and a format of an additional header in a case that a payload includes a part of a single input packet in a multimedia system according to an embodiment of the present disclosure will be described with reference to FIG. 6.

Figure 6:
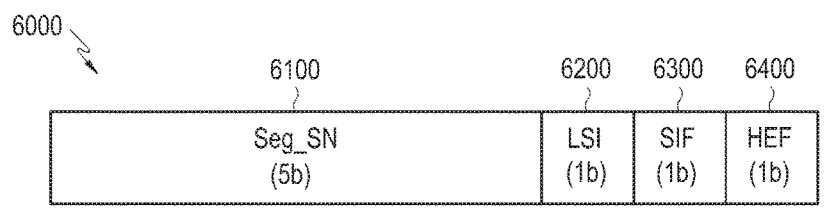
FIG. 6 schematically illustrates a format of an additional header in a case that a payload includes a part of a single input packet in a multimedia system according to an embodiment of the present disclosure.

FIG. 6 schematically illustrates a format of an additional header in a case that a payload includes a part of a single input packet in a multimedia system according to an embodiment of the present disclosure.

Referring to FIG. 6, it will be noted that a format of an additional header illustrated in FIG. 6 is a format of an additional header in a case that a payload includes a part of a single input packet.

Referring to FIG. 6, if a payload, e.g., a payload 3200 includes a part of a single input packet, an additional header, e.g., an additional header 6000 includes a segment_sequence_number field 6100 indicating an identifier (ID) of a segmented input packet, a last_segment_indicator (LSI) field 6200 indicating whether the payload 3200 includes the last segment of an input packet, an SIF field 6300 indicating whether an SID is present, and an HET field 6400 indicating whether a header extension is present.

According to an embodiment of the present disclosure in FIG. 4, the additional header 6000 in FIG. 6 may be present only if a payload 3200, e.g., a payload 3200 included in an ALP packet includes a part of a single input packet. That is, the additional header 6000 may be present only if a value of a PC field, e.g., a PC field 4200 is 1 and a value of an S/C field, e.g., an S/C field 4350 is 0.

Meanwhile, the additional header 6000 in FIG. 6 may be expressed as Table 4.

TABLE 4

| Syntax | Number of bits | Mnemonic |
|---|---|---|
| Additional_Header_for_Segmentation ( ) { | | |
|    Segment_Sequence_Number | 5 | |
|    Last_Segment_Indicator | 1 | |
|    SIF | 1 | bslbf |
|    HEF | 1 | bslbf |

TABLE 4-continued

| Syntax | Number of bits | Mnemonic |
|---|---|---|
|    if (SIF =="1"){ | | |
|       SID | 8 | bslbf |
|    } | | |
|    if (HEF =="1"){ | | |
|       Header_Extension( ) | var | |
|    } | | |
| } | | |

In Table 4, a segment_sequence_number field indicates a number for identifying a part, i.e., a segment of an input packet included in a payload, e.g., a payload 3200, and may be an integer which is equal to or greater than 0. For example, in a case that the input packet is segmented into a plurality of segments, if the first segment among the plurality of segments is included in the payload 3200, a value of the segment_sequence_number field 6100 is set to 0. Whenever, the next segment of the input packet is transported through an ALP packet, the value of the segment_sequence_number field 6100 is incremented by a preset value, e.g., 1.

In Table 4, a last_segment_indicator field indicates whether a payload, e.g., a payload 3200 includes the last segment (or the last byte) of the input packet, and may be implemented with a 1-bit field. If the payload 3200 includes the last segment (or the last byte) of the input packet, a value of the last_segment_indicator field, e.g., an LSI field 6200 is set to 1. If the payload 3200 does not include the last segment (or the last byte) of the input packet, the value of the LSI field 6200 is set to 0.

In Table 4, an SIF field indicates whether an SID field is present after an HEF field, e.g., an HEF field 6400. The SIF field may be implemented with a 1-bit field. If a value of the SIF field, e.g., an SIF field 6300 is 0, there is no SID field. If the value of the SIF field 6300 is 1, the SID field is present after the HEF field 6400.

In Table 4, an HEF field indicates whether a header extension is present after an additional header, e.g., an additional header 6000. For example, the HEF field may be implemented with a 1-bit field. For example, if a value of an HEF field 6400 is 0, there is no header extension. If the value of the HEF field 6400 is 1, the header extension is present after the additional header 6000. In a case that the header extension is present, the header extension is present after the SID field if the SID field is present, and the header extension is present after the HEF field 6400 if there is no SID field.

A format of an additional header in a case that a payload includes a part of a single input packet in a multimedia system according to an embodiment of the present disclosure has been described with reference to FIG. 6, and a format of an additional header in a case that a payload includes a plurality of input packets in a multimedia system according to an embodiment of the present disclosure will be described with reference to FIG. 7.

Figure 7:
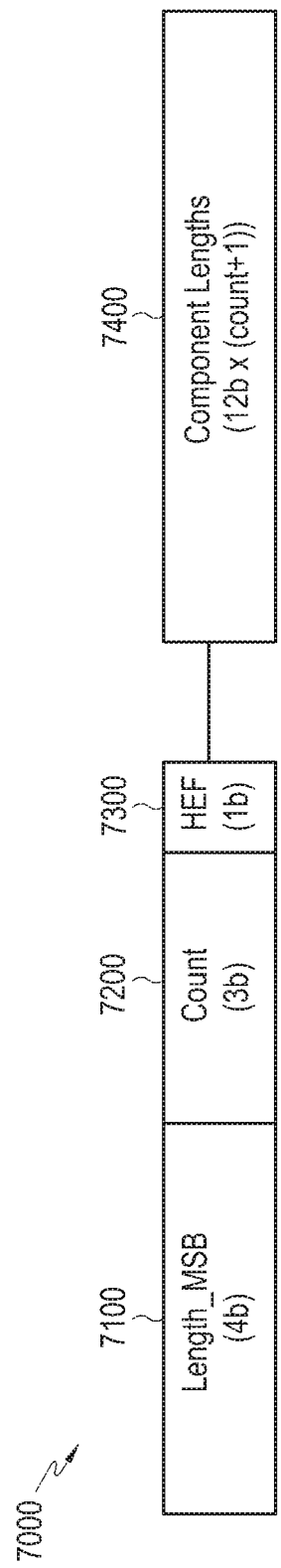
FIG. 7 schematically illustrates a format of an additional header in a case that a payload includes a plurality of input packets in a multimedia system according to an embodiment of the present disclosure.

FIG. 7 schematically illustrates a format of an additional header in a case that a payload includes a plurality of input packets in a multimedia system according to an embodiment of the present disclosure.

Referring to FIG. 7, it will be noted that a format of an additional header in FIG. 7 is a format of an additional header in a case that a payload includes a plurality of input packets.

If a payload, e.g., a payload 3200 (shown in FIG. 3) includes a plurality of input packets, an additional header 7000 includes a Length_MSB field 7100 indicating MSB 4 bits of a length in bytes of the payload 3200 in a case that the length in bytes of the payload 3200 is expressed with 15 bits, a Count field 7200 indicating the number of input packets included in the payload 3200, an HEF field 7300 indicating whether a header extension is present, and a Component Length field 7400 indicating a length of each input packet.

Meanwhile, the additional header 7000 in FIG. 7 may be expressed as Table 5.

TABLE 5

| Syntax | Number of bits | Mnemonic |
|---|---|---|
| Additional_Header_for_Concatenation ( ) { | | |
|    Length_MSB | 4 | uimsbf |
|    Count | 3 | uimsbf |
|    HEF | 1 | bslbf |
|    for(i=0; i<Count-1; i++) { | | |
|       Component_Length | 12 | uimsbf |
|    } | | |
|    if (HEF =="1"){ | | |
|       Header_Extension( ) | | var |
|    } | | |
| } | | |

In Table 5, a Length_MSB indicates LSB 4 bits of a length in bytes of a payload, e.g., a payload 3200 (shown in FIG. 3) in a case that the length in bytes of the payload 3200 is expressed 15 bits. The LSB 4 bits are combined with LSB 11 bits indicated by a Length field 4400 included in a base header, e.g., a base header 3110 thereby indicating a total length in bytes of the payload 3200.

In Table 5, a count field indicates the number of input packets included in the payload 3200. For example, the count field may be implemented with a 3-bit field. A value of the count field, e.g., a Count field 7200 is set to (the number of the input packets included in the payload 3200-2).

In Table 5, an HEF field indicates whether a header extension is present after an additional header, e.g., an additional header 7000. For example, the HEF field may be implemented with a 1-bit field. If a value of an HEF field, e.g., an HEF field 7300 is 0, there is no header extension. If the value of the HEF field 7300 is 1, a header extension is present after the additional header 7000. In a case that there is the header extension, if an SID field is present, the header extension is present after the SID field, and if there is no SID field, the extension header is present after the HEF field 7300.

In Table 5, a Component_Length field indicates lengths of input packets included in a payload, e.g., a payload 3200. The lengths of the input packets are included in the same order as the input packets included in the payload 3200 and a length of the last input packet is not included.

A format of an additional header in a case that a payload includes a plurality of input packets in a multimedia system according to an embodiment of the present disclosure has been described with reference to FIG. 7, and a format of an optional header included in an ALP packet in a multimedia system according to an embodiment of the present disclosure will be described with reference to FIG. 8.

Figure 8:
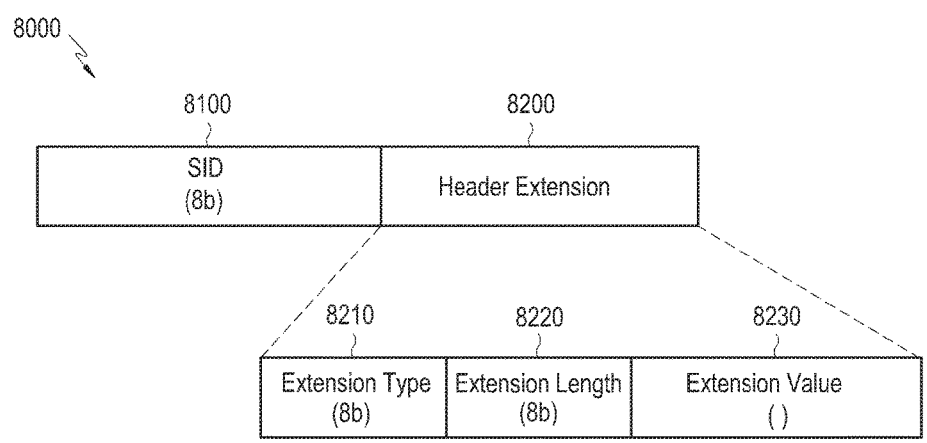
FIG. 8 schematically illustrates a format of an optional header included in an ALP packet in a multimedia system according to an embodiment of the present disclosure.

FIG. 8 schematically illustrates a format of an optional header included in an ALP packet in a multimedia system according to an embodiment of the present disclosure.

Referring to FIG. 8, an optional header 8000, e.g., an optional header 3130 (shown in FIG. 3) may include an SID field 8100 indicating an SID and a header extension field 8200.

The header extension field 8200 includes an extension type field 8210 indicating a type of a header extension, an extension length field 8220 indicating a length of an header extension, and an extension value field 8230 including contents of extension fields.

A length of the extension value 8230 is given by the extension length field 8220. A receiving apparatus checks a value of the extension type field 8210, calculates a total length of the header extension field 8200 based on the value of the extension type field 8210 if the value of the extension type field 8210 is a value that the receiving apparatus may not analyze, and removes bytes which correspond to the calculated length.

A value of the SID field 8100 is set to a unique value which may be identified within one radio frequency (RF) signal, and a broadcast link layer, e.g., a broadcast link layer 1400 may perform link layer filtering based on the value of the SID field 8100.

For example, it will be assumed that five services are transported through an RF signal which has one signal processing path, e.g., one PLP, and each of the five services are transported using three UDP/IP ports. A receiving apparatus recovers link layer packets by processing a signal received through the PLP corresponding to a preset processing scheme. The receiving apparatus recovers packets which correspond to fifteen UDP/IP sessions and outputs the recovered packets to an upper layer.

A service selected by a terminal uses three UDP/IP sessions, so packets transported through the fifteen UDP/IP sessions are filtered at an IP layer, e.g., an IP layer 1300 or a UDP layer, e.g., a UDP layer 1200 according to an address thereof. This means that most of packets output from a link layer, e.g., about 80% of packets output from the link layer are unnecessary data at an upper layer, and this decreases system efficiency.

If the broadcast physical layer 1500, the broadcast link layer 1400, and the IP layer 1300 are implemented with separate hardware, or if the broadcast physical layer 1500, the broadcast link layer 1400, and the IP layer 1300 share an interface with other shared layer, system efficiency may be significantly decrease due to unnecessary data transmission.

So, an embodiment of the present disclosure allocates a separate SID to each service, allocates an SID to a link layer packet carrying a service, processes only a link layer packet with an SID which corresponds to a service when the service is selected, and outputs only the processed packets to an IP layer thereby increasing system efficiency.

In an embodiment of the present disclosure, one-to-one mapping between a service and an SID is described, however, an SID may be freely allocated according to a grouping format of input packets to be grouped within one link layer stream. Here, the grouping format may be an IP address, a UDP port number, a session identifier (ID) of an application layer protocol, or a combination of the IP address, the UDP port number, the session ID of the application layer protocol. The session ID of the application layer protocol may be a packet_id in an MMTP, or a transport session identifier (TSI) in a ROUTE protocol.

Further, one ALP packet stream may include ALP packets to which an SID is allocated and ALP packets to which an SID is not allocated. In this case, it may be preferred to process the ALP packets to which the SID is not allocated to output the processed packets to an upper layer, and perform a filtering operation based on the ALP packets to which the SID is allocated.

In an embodiment of the present disclosure, a value of the SID field 8100 may be set to a unique value which may be identified within one PLP. In this case, one sub-stream is identified based on a combination of a PLP and an SID.

A format of an additional header in a case that a payload includes a link layer signaling in a multimedia system according to an embodiment of the present disclosure will be described with reference to FIG. 9.

Figure 9:
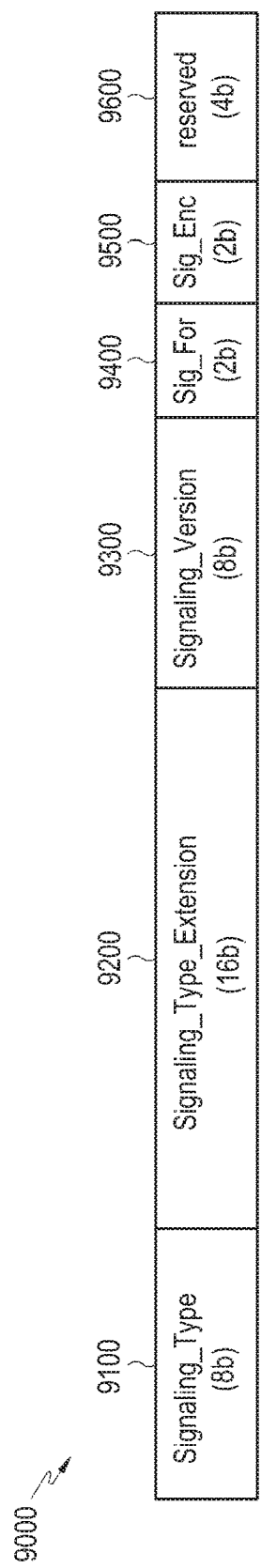
FIG. 9 schematically illustrates a format of an additional header in a case that a payload includes a link layer signaling in a multimedia system according to an embodiment of the present disclosure.

FIG. 9 schematically illustrates a format of an additional header in a case that a payload includes a link layer signaling in a multimedia system according to an embodiment of the present disclosure.

Referring to FIG. 9, it will be noted that a format of an additional header 9000 is a format of an additional header in a case that a payload, e.g., a payload 3200 (shown in FIG. 3) includes a link layer signaling.

The additional header 9000 includes a Signaling_Type field 9100 indicating a type of the link layer signaling, a Signaling_Type_Extension field 9200 indicating extension information for the type of the link layer signaling, a Signaling_Version field 9300 indicating a version of the link layer signaling, a Signaling_Format field 9400 indicating a data format of the link layer signaling, a Signaling_Encoding field 9500 indicating an encoding/compressing scheme which is applied to the link layer signaling, and a reserved field 9600. For example, the Signaling_Type_Extension field 9200 may be implemented with a 16-bit field, the Signaling_Version field 9300 may be implemented with an 8-bit field, the Signaling_Format field 9400 may be implemented with a 2-bit field, the Signaling_Encoding field 9500 may be implemented with a 2-bit field, and the reserved field 9600 may be implemented with a 4-bit field.

The additional header 9000 in FIG. 9 may be expressed as shown in Table 6.

TABLE 6

| Syntax | Number of bits | Mnemonic |
| --- | --- | --- |
| Additional_Header_for_Signaling_Information( ) { | | |
|   Signaling_Type | 8 | uimsbf |
|   Signaling_Type_Extension | 16 | bslbf |
|   Signaling_Version | 8 | uimsbf |
|   Signaling_Format | 2 | uimsbf |
|   Signaling_Encoding | 2 | uimsbf |
|   Reserved | 4 | bslbf |
| } | | |

In Table 6, a Signaling_Type field indicates a type of a link layer signaling included in the payload 3200. For example, the Signaling_Type field may be implemented with an 8-bit field. If a value of the Signaling_Type field is "0x00", it means that the type of the link layer signaling included in the payload 3200 is a PLP_Configuration_Table. If a value of the Signaling_Type field is "0x01", it means that the type of the link layer signaling included in the payload 3200 is an ROHC-U_description_table (RDT). The PLP_Configuration_Table and the ROHC-U_description_table will be described below, and a detailed description thereof will be omitted herein.

In Table 6, a Signaling_Type_Extension field indicates extension information for the type of the link layer signaling included in the payload 3200. For example, the Signaling_Type_Extension field may be implemented with a 16-bit field.

In Table 6, a Signaling_Version field indicates version information of the link layer signaling included in the payload 3200. For example, the Signaling_Version field may be implemented with an 8-bit field. A value of the Signaling_Version field is increased by 1 whenever a version of a link layer signaling identified by the Signaling_Type field is changed.

In Table 6, a Signaling_Format field indicates a data format of the link layer signaling included in the payload 3200. For example, the Signaling_Format field may be implemented with a 2-bit field. For example, the Signaling_Format field may indicate a data format as shown in Table 7.

TABLE 7

| Signaling_Format | Meaning |
| --- | --- |
| 00 | Binary |
| 01 | XML |
| 10 | Reserved |
| 11 | Reserved |

In Table 7, if a value of the Signaling_Format field is "00", it means that a data format of the link layer signaling included in the payload 3200 is a binary format. In Table 7, if a value of the Signaling_Format field is "01", it means that a data format of the link layer signaling included in the payload 3200 is an extensible markup language (XML) format. In Table 7, if a value of the Signaling_Format field is one of "10" and "11", it means that the value of the Signaling_Format field is reserved for future use.

In Table 7, a Signaling_Encoding field indicates an encoding/compressing scheme applied to the link layer signaling included in the payload 3200. For example, the Signaling_Encoding field may be implemented with a 2-bit field. For example, the Signaling_Encoding field may express an encoding/compressing scheme as shown in Table 8.

TABLE 8

| Signaling_Encoding | Number of bits |
| --- | --- |
| 00 | No Compression |
| 01 | DEFLATE(RFC1951) |
| 10 | Reserved |
| 11 | Reserved |

In Table 8, if a value of the Signaling_Encoding field is "00", it means that a compressing scheme is not applied to the link layer signaling included in the payload 3200. In Table 8, if a value of the Signaling_Encoding field is "01", it means that a compressing scheme applied to the link layer signaling included in the payload 3200 is a DEFLATE scheme defined in a request for comments (RFC) 1951. In Table 8, if a value of the Signaling_Encoding field is one of "10" and "11", it means that the value of the Signaling_Encoding field is reserved for future use.

Meanwhile, some of fields included in an additional field as shown in Table 6 may be omitted according to a scheme of operating a link layer protocol. Further, other fields may be added into the additional header as shown in Table 6 according to the scheme of operating the link layer protocol.

For example, in a case that a data format of a link layer signaling is limited to a binary format or an XML format, a Signaling_Format field among fields included in an additional header as shown in Table 6 may be omitted. For another example, in a case that an encoding/compressing scheme is not applied to a link layer signaling, or a predetermined scheme is applied to a link layer signaling, a Signaling_Encoding field among the fields included in the additional header as shown in Table 6 may be omitted.

In a multimedia system according to an embodiment of the present disclosure, it will be assumed that one link layer packet stream is allocated to one PLP. The link layer packet stream may be generated based on inputs of various formats as described in FIG. 2.

In an embodiment of the present disclosure, for convenience, it will be assumed that inputs to a broadcast link layer 1400 include a link layer signaling 1310 and an IP packet 1315. In an embodiment of the present disclosure, for convenience, it will be assumed that a robust header compression (ROHC) scheme standardized in an Internet engineering task force (IETF) is used as a header compression scheme.

Table 9 shows an example of a link mapping table proposed in a multimedia system according to an embodiment of the present disclosure.

TABLE 9

| Syntax | Number of bits | Mnemonic |
|---|---|---|
| PLP_Configuration_Table( ) { | | |
|   signaling_type | 8 | uimsbf |
|   PLP_ID | 8 | uimsbf |
|   Num_session | 8 | uimsbf |
|   for(i=0; i< Num_ session; i++) { | | |
|     Src_IP_add | 32 | uimsbf |
|     Dst_IP_add | 32 | uimsbf |
|     Src_UDP_port | 16 | uimsbf |
|     Dst_UDP_port | 16 | uimsbf |
|     SID_flag | 1 | bslbf |
|     Compressed_flag | 1 | bslbf |
|     reserved | 6 | '000000' |
|     if(SID_flag =="1") { | | |
|       SID | 8 | uimsbf |
|     } | | |
|     if(Compressed_flag == "1") { | | |
|       Context_ID | 8 | uimsbf |
|     } | | |
|   } | | |
| } | | |

In Table 9, a Signaling_type field indicates a type of a signaling carried by the link mapping table. The link mapping table in Table 9 is a PLP configuration table (PCT), so a value of the Signaling_type field may be set to a value indicating the PCT. In an embodiment of the present disclosure, for example, a PCT for each of an IPv4 and IP version 6 (IPv6) may be defined, and different table ids may be allocated to the PCTs of the IPv4 and the IPv6. For example, the Signaling_type field may be implemented as an 8-bit field. Here, a table_id denotes an ID of a link mapping table.

In Table 9, a PLP_ID field indicates a PLP_ID to which information included in a current PLP is applied. For example, the PLP_ID field may be implemented as an 8-bit field.

In Table 9, a Num_session field indicates the number of sessions, e.g. UDP/IP sessions, of which information are described in a current table, e.g., a current PCT. For example, the Num_session field may be implemented as an 8-bit field.

In Table 9, a Src_IP_add field indicates a source IP address of a session carried by the PLP_ID field. For example, the Src_IP_add field may be implemented as a 32-bit field.

In Table 9, a Dst_IP_add field indicates a destination IP address of a session carried by the PLP_ID field. For example, the Dst_IP_add field may be implemented as a 32-bit field.

In Table 9, a Src_UDP_port field indicates a source UDP port number. For example, the Src_UDP_port field may be implemented as a 16-bit field.

In Table 9, a Dst_UDP_port field indicates a destination UDP port number. For example, the Dst_UDP_port field may be implemented as a 16-bit field.

In Table 9, an SID_flag field indicates whether an SID is allocated. For example, the SID_flag field may be implemented with a 1-bit field. For example, only if a value of the SID_flag field is 1, an SID field is added to an ALP packet including a UDP/IP packet which is carried through a session.

In Table 9, an SID field indicates an SID. For example, the SID field may be implemented with an 8-bit field. For example, the SID field exists only if a value of the SID_flag field is 1. The SID may be a value which is unique within one RF signal, e.g., a physical layer frame or a PLP.

In Table 9, a Compressed_flag field indicates whether a header compression scheme is applied, e.g., whether a header compression scheme is applied to an ALP packet carrying the sessions. For example, the Compressed_flag field may be implemented with a 1-bit field. For example, if the header compression scheme is applied, a value of the Compressed_flag field is set to 1, and a Context_Id is present after the Compressed_flag field.

In Table 9, a Context_ID field indicates a context ID (CID) for identifying an IP stream to which a header compression scheme is applied, and a value of the Context_ID field is generated based on a header compression standard such as ROHC, and/or the like. The Context_ID field exists only if the value of the Compressed_flag field is 1.

In Table 9, if a UDP/IP stream is used as an input to a link layer, the Src_IP_add field, the Dst_IP_add field, the Src_Udp_port field, and the Dst_Udp_port field are for identifying the UDP/IP stream. So, if a packet which is encapsulated based on other protocol, not an UDP/IP is used as an input to the link layer, it may be understood that the Src_IP_add field, the Dst_IP_add field, the Src_Udp_port field, and the Dst_Udp_port field need to be changed to information suitable for the other protocol.

Table 9 is a link mapping table in a case of assuming a link layer protocol optionally supporting an SID, whether an SID_flag field and an SID field exist may be varied according to a link layer protocol. If the link layer protocol does not support an SID, the link mapping table as described in Table 9 does not include an SID_flag field and an SID field. If the link layer protocol mandatorily supports an SID, an SID_flag field may be omitted in the link mapping table as described in Table 9. Further, information related to an SID may be transmitted through a link mapping table different from a link mapping table through which information related to the header compression is transmitted.

The link mapping table as described in Table 9 is a link mapping table in a case that the link mapping table is transmitted through a link mapping protocol optionally supporting header compression on a session basis, and whether the Compressed_flag field and the Context_id field exist may be varied according to a link layer protocol.

For example, if the link layer protocol does not support header compression, a link mapping table does not include the Compressed_flag field and the Context_id field. For another example, if the link layer protocol mandatorily supports header compression, the Compressed_flag field may be omitted in a link mapping table. For still another example, if the link layer protocol supports header compression on a PLP basis, in a link mapping table, the Compressed_flag field may be located outside of a Num_session loop, and the Context_id field may be optionally located within the Num_session loop according to a value of the Compressed_flag field. Further, information related to header compression may be transmitted through a link mapping table different from a link mapping table through which information related to an SID is transmitted.

It will be assumed that the link mapping table in FIG. 9 describes information related to one PLP, and the link mapping table in FIG. 9 includes a PLP_ID field for informing information related to a PLP other than the PLP through which the link mapping table is transmitted.

If information related to a plurality of PLPs is transmitted using one link mapping table, a Num_PLP field indicating the number of PLPs of which information is described may be included in a link mapping table as shown in Table 10. In a case of assuming that each of all link mapping tables indicates information on a PLP through which a link mapping table is transmitted, a PLP_ID field may be omitted in a link mapping table.

TABLE 10

| Syntax | Number of bits | Mnemonic |
|---|---|---|
| PLP_Configuration_Table( ) { | | |
|   signaling_type | 8 | uimsbf |
|   reserved | 2 | '00' |
|   Num_PLP | 6 | uimsbf |
|   for(i=0;i<Num_PLP;i++) { | | |
|     PLP_ID | 8 | uimsbf |
|     Num_session | 8 | uimsbf |
|     for(j=0; j< Num_ session; i++) { | | |
|       Src_IP_add | 32 | uimsbf |
|       Dst_IP_add | 32 | uimsbf |
|       Src_UDP_port | 16 | uimsbf |
|       Dst_UDP_port | 16 | uimsbf |
|       SID_flag | 1 | bslbf |
|       Compressed_flag | 1 | bslbf |
|       reserved | 6 | '000000' |
|       if(SID_flag =="1") { | | |
|         SID | 8 | uimsbf |
|       } | | |
|       if(Compressed_flag == "1") { | | |
|         Context_ID | 8 | uimsbf |
|       } | | |
|     } | | |
|   } | | |
| } | | |

The link mapping table as shown in Table 10 further includes a Num_PLP field including the number of PLPs compared to the link mapping table as shown in Table 9. A Signaling_type field, a PLP_ID field, a Num_session field, a Src_IP_add field, a Dst_IP_add field, a Src_UDP_port field, a Dst_UDP_port field, an SID_flag field, an SID field, a Compressed_flag field, and a Context_ID included in Table 10 are similar to a Signaling_type field, a PLP_ID field, a Num_session field, a Src_IP_add field, a Dst_IP_add field, a Src_UDP_port field, a Dst_UDP_port field, an SID_flag field, an SID field, a Compressed_flag field, and a Context_ID included in Table 9, so a detailed description thereof will be omitted herein.

A multimedia system according to an embodiment of the present disclosure may operate a link mapping table as shown in Table 9 and a link mapping table as shown in Table 10 together according to a system operating scheme. For example, different Signaling_type field values are allocated to the link mapping table as shown in Table 9 and the link mapping table as shown in Table 10, so two link mapping tables may be operated. For another example, the same Signaling_type field value is used for the link mapping table as shown in Table 9 and the link mapping table as shown in Table 10, and whether a link mapping table is changed, a PLP ID of which information is included in, and/or the like may be indicated using a Signaling_Type_Extension field. It will be noted that a scheme of operating a link mapping table as described above is optional, and one of various embodiments of the present disclosure.

In a case that a standardized packet compression scheme such as ROHC, and/or the like is used in a multimedia system according to an embodiment of the present disclosure, a link layer signaling may further include an additional signaling table following the standardized packet compression scheme. At this time, a Context_ID field as described in Tables 9 and 10 may be used as information for providing a reference for context information described in the additional signaling table and a UDP/IP session which is described in the link mapping table in Tables 9 and 10.

Table 11 shows an example of header compression information, e.g., an ROHC-U_description_table in a case that a robust header compression U-mode (ROHC-U) scheme is used as a header compression algorithm in a multimedia system according to an embodiment of the present disclosure.

TABLE 11

| Syntax | Number of bits | Mnemonic |
|---|---|---|
| ROHC-U_description_table { | | |
|   signaling_type | 8 | TBD |
|   PLP_ID | 8 | uimsbf |
|   adaptation_mode | 2 | uimsbf |
|   context_config | 2 | bslbf |
|   reserved | 4 | bslbf |
|   num_context | 8 | uimsbf |
|   for(i=0;i<num_context;i++) { | | |
|     context_id | 8 | uimsbf |
|     context_profile | 8 | uimsbf |
|     if(context_config=0x01) { | | |
|       context_length | 8 | uimsbf |
|       static_chain_byte( ) | var | uimsbf |
|     } | | |
|     else if(context_config=0x02) { | | |
|       context_length | 8 | uimsbf |
|       dynamic_chain_byte( ) | var | uimsbf |
|     } | | |
|     else if(context_config=0x03) { | | |
|       context_length | 8 | uimsbf |
|       static_chain_byte( ) | var | uimsbf |
|       dynamic_chain_byte( ) | var | uimsbf |
|     } | | |
|   } | | |
| } | | |

In Table 11, an adaptation_mode field indicates an adaptation module of a corresponding PLP. The adaptation_mode field may be implemented with a 2-bit field, and a detailed description of the adaptation_mode field will be omitted herein.

In Table 11, a context_config field indicates a combination of the context information, and may be implemented with, for example, a 2-bit field. In Table 11, a num_context field indicates the number of contexts which are described in the ROHC-U_description_table, and may be implemented with, for example, an 8-bit field.

In Table 11, a context_id field indicates a context ID (CID) of a compressed IP stream, and may be implemented with, for example, an 8-bit field. In Table 11, a context_profile field indicates a range of protocols used for compressing an IP stream, and may be implemented with, for example, an 8-bit field.

In Table 11, a context_length field indicates a length of a static chain byte sequence, and may be implemented with, for example, an 8-bit field. In Table 11, a static_chain_byte( ) field indicates static information used for initializing the ROHC-U decompressor. In Table 11, a dynamic_chain_byte( ) field indicates dynamic information used for initializing the ROHC-U decompressor.

An example of a process of transmitting data in a transmitting apparatus in a multimedia system supporting a link layer protocol according to an embodiment of the present disclosure will be described with reference to FIG. 10.

Figure 10:
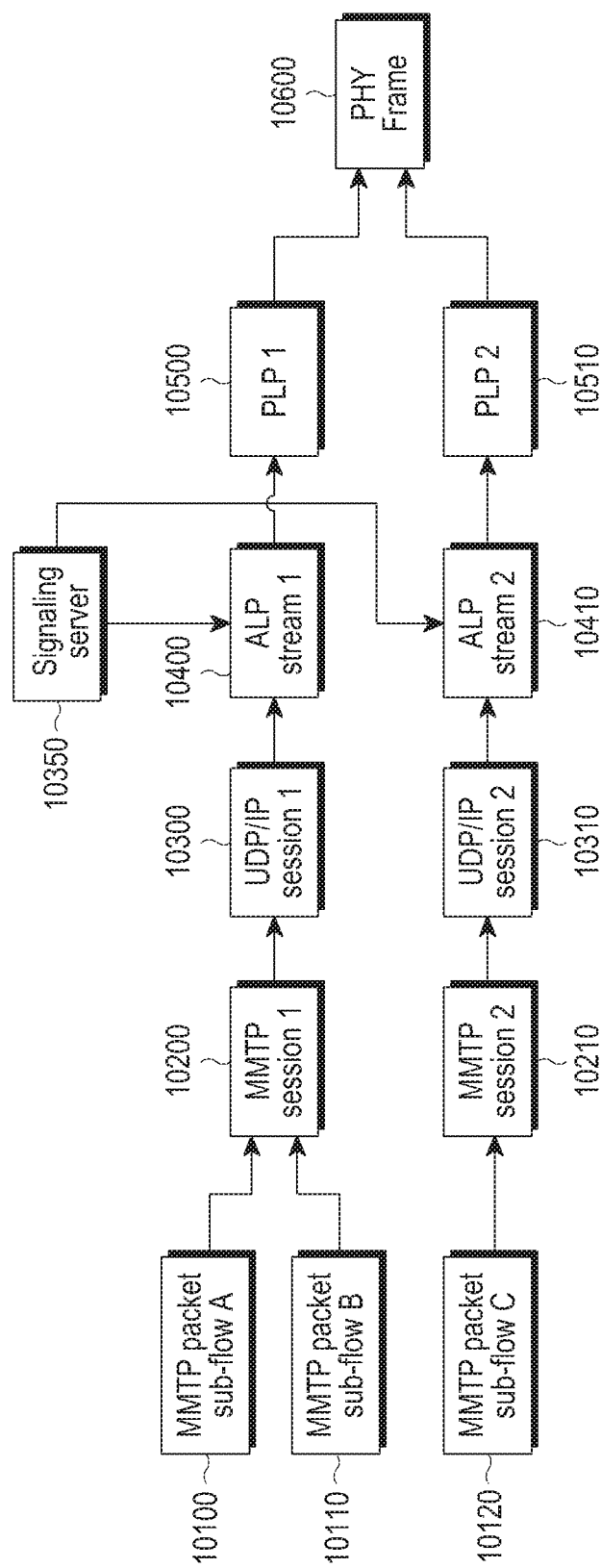
FIG. 10 schematically illustrates an example of a process of transmitting data in a transmitting apparatus in a multimedia system supporting a link layer protocol according to an embodiment of the present disclosure.

FIG. 10 schematically illustrates an example of a process of transmitting data in a transmitting apparatus in a multimedia system supporting a link layer protocol according to an embodiment of the present disclosure.

Referring to FIG. 10, in a multimedia system according to an embodiment of the present disclosure, a transmitting apparatus provides a service using two PLPs with different reliabilities, e.g., a PLP 1 10500 and a PLP 2 10510. It will be assumed that a reliability of the PLP 1 10500 is higher than a reliability of the PLP 2 10510. One service is provided using three MMTP packet sub-flows 10100, 10110, and 10120. The MMTP packet sub-flows 10100, 10110, and 10120 denote flows of an MMTP packet which have the same packet_id. For example, in FIG. 10, it will be assumed that the MMTP packet sub-flow A 10100 includes a service-level signaling message, the MMTP packet sub-flow B 10110 includes voice data, and the MMTP packet sub-flow C 10120 includes image data. The service-level signaling message includes a list of assets configuring a service, and a characteristic and an address of each asset. In an embodiment of the present disclosure, the address of the asset includes a packet_id of an MMTP packet including the asset, and may include a destination IP address and a port number of a UDP/IP session through which the MMTP packet is transmitted if necessary. In an embodiment of the present disclosure, the address of the asset may include a PLP identifier (ID) of a PLP through which the MMTP packet is transmitted.

The MMTP packet sub-flow A 10100 and the MMTP packet sub-flow B 10110 are multiplexed as an MMTP session 1 10200, and the multiplexed signal, i.e., a UDP/IP packet is transferred to a UDP/IP session 1 10300. The UDP/IP packet transferred to the UDP/IP session 1 10300 and an output from a Signaling server 10350 are generated as an ALP packet, the ALP packet is multiplexed as an ALP stream 1 10400, and the ALP stream 1 10400 is transferred to the PLP 1 10500. The MMTP packet sub-flow C 10120 is multiplexed as an MMTP session 2 10210, and the multiplexed signal, i.e., a UDP/IP packet is transferred to a UDP/IP session 2 10310. The UDP/IP packet transferred to the UDP/IP session 2 10310 and an output from the Signaling server 10350 are generated as an ALP packet, the ALP packet is multiplexed as an ALP stream 2 10410, and the ALP stream 2 10410 is transferred to the PLP 2 10510. The stream(s) may be transferred from PLP 1 and/or PLP 2 to physical layer frame (PHY frame) 10600 as shown in FIG. 10.

The output from the Signaling server 10350 includes a signaling table or an UDP/IP packet which is generated by encapsulating a signaling table. The signaling table may be a PCT as described above, and the UDP/IP packet which is generated by encapsulating the signaling table may be a UDP/IP packet including a low-level signaling (LLS) table of ATSC 3.0.

Table 12 shows an example of the LLS table.

TABLE 12

| Syntax | No. of Bits | Format |
|---|---|---|
| LLS_table( ) { | | |
|     LLS_table_id | 8 | uimsbf |
|     provider_id | 8 | uimsbf |
|     LLS_table_version | 8 | uimsbf |
|     switch (LLS_table_id) { | | |
|         case 0x01: | | |
|             SLT | var | |
|             break; | | |
|         case 0x02: | | |
|             RRT | var | |
|             break; | | |
|         case 0x03: | | |
|             SystemTime | var | |
|             break; | | |
|         case 0x04: | | |
|             CAP | var | |
|             break; | | |
|         default: | | |
|             reserved | var | |
|     } | | |
| } | | |

In Table 12, an SLT denotes a service list table, and indicates information related to a location from which a list of broadcast services and a service-level signaling for each service may be acquired. The information related to the location from which the service-level signaling may be acquired includes a protocol which a transmission packet including the service-level signaling follows, an IP address, and a UDP port. In an embodiment of the present disclosure, the information related to the location from which the service-level signaling may be acquired further includes a PLP identifier of a PLP through which the transmission packet is transmitted.

In FIG. 10, the output from the Signaling server 10350 are transferred to all PLPs, however, the output from the Signaling server 10350 may be transferred to a specific PLP according to a type of a signaling. For example, all of the service-level signaling and the output from the Signaling server 10350 may be transferred to one PLP, and if a plurality of service providers use one RF signal, a signaling is configured for each service provider, and the configured signalings may be transmitted to different PLPs. For example, a service provider may be a service operator. A signaling table and a UDP/IP which is generated by encapsulating the signaling table among the output of the Signaling server 10350 may be transmitted through the same PLP or different PLPs.

Although FIG. 10 illustrates an example of a process of transmitting data in a transmitting apparatus in a multimedia system supporting a link layer protocol according to an embodiment of the present disclosure, various changes could be made to FIG. 10. For example, although shown as a series of operations, various operations in FIG. 10 could overlap, occur in parallel, occur in a different order, or occur multiple times.

An example of a process of transmitting data in a transmitting apparatus supporting a link layer protocol in a multimedia system according to an embodiment of the present disclosure has been described with reference to FIG. 10, and a process of configuring a channel map in a receiving apparatus in a multimedia system supporting a link layer protocol according to an embodiment of the present disclosure will be described with reference to FIG. 11.

Figure 11:
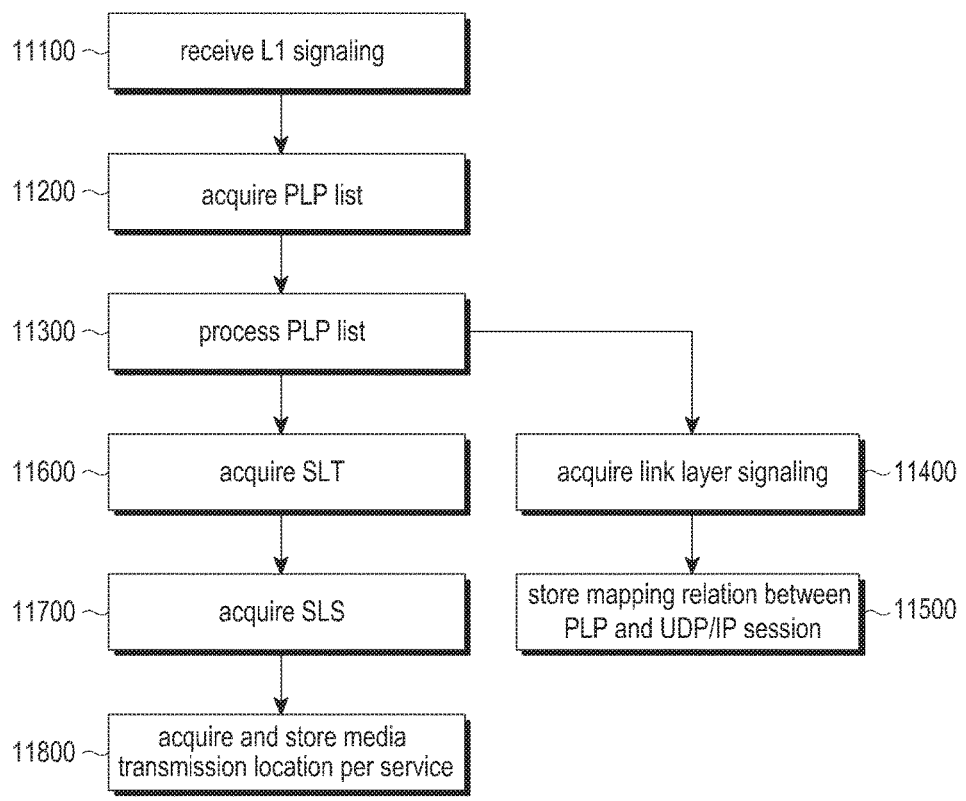
FIG. 11 schematically illustrates a process of configuring a channel map in a receiving apparatus in a multimedia system supporting a link layer protocol according to an embodiment of the present disclosure.

FIG. 11 schematically illustrates a process of configuring a channel map in a receiving apparatus in a multimedia system supporting a link layer protocol according to an embodiment of the present disclosure.

Referring to FIG. 11, a receiving apparatus receives an L1 signaling through an RF signal at operation 11100. The L1 signaling includes information for receiving and processing a PLP which is transmitted through the RF signal, e.g., information on a PLP through which an SLT is transmitted. The receiving apparatus acquires a PLP list through the SLT is transmitted by processing the L1 signaling at operation 11200, and processes the PLP through which the SLT is transmitted at operation 11300. A result of the PLP processing may be a link layer packet according to an embodiment of the present disclosure.

The receiving apparatus acquires a link layer signaling by processing a link layer packet including the link layer signaling among the link layer packets at operation 11400. The link layer signaling may be a PCT according to an embodiment of the present disclosure. The receiving apparatus stores mapping relation between a PLP and a UDP/IP session by analyzing the link layer signaling at operation 11500.

The receiving apparatus extracts an IP packet by processing a link layer packet including the IP packet among the link layer packets, and transfers the IP packet to a UDP/IP processor included in the receiving apparatus. The receiving apparatus acquires an SLT by processing an IP packet including the SLT among the IP packets at operation 11600. In an embodiment of the present disclosure, the IP packet including the SLT may be a packet with an IP address for a specific object and a destination UDP port number. The SLT includes information from which a service layer signaling (SLS) may be acquired per service, and the receiving apparatus acquires an SLS using the information at operation 11700. The receiving apparatus acquires and stores a media transmission location per service by processing the SLS at operation 11800.

Upon detecting that a service is selected from a user after performing the described process, the receiving apparatus may acquire a service-level signaling up to a UDP/IP session-level for the selected service and a media transmission location based on information provided by an SLT and an SLS. For example, in a case that an MMTP is used, the receiving apparatus may acquire a destination address, a port number, and a packet_id for identifying an MMTP packet sub-flow included in the MMTP session. The receiving apparatus may acquire the service-level signaling and a media transmission location up to a PLP-level based on location information up to the UDP/IP session-level and mapping information between a UDP/IP session and a PLP provided in a link layer signaling to receive data.

In a multimedia system according to an embodiment of the present disclosure, it will be assumed that a link layer signaling and an SLT are transmitted through the same PLP. However, the link layer signaling and the SLT may be transmitted through different PLPs. In an embodiment of the present disclosure, a link layer signaling may be transmitted through all PLPs.

In an embodiment of the present disclosure, it will be assumed that PLP-level location information is transferred through a link layer signaling. However, the PLP-level location information may be transferred through an SLT or an SLS.

Although FIG. 11 illustrates a process of configuring a channel map in a receiving apparatus in a multimedia system supporting a link layer protocol according to an embodiment of the present disclosure, various changes could be made to FIG. 11. For example, although shown as a series of operations, various operations in FIG. 11 could overlap, occur in parallel, occur in a different order, or occur multiple times.

A process of configuring a channel map in a receiving apparatus in a multimedia system supporting a link layer protocol according to an embodiment of the present disclosure has been described with reference to FIG. 11, and another example of a process of transmitting data in a transmitting apparatus in a multimedia system supporting a link layer protocol according to an embodiment of the present disclosure will be described with reference to FIG. 12.

Figure 12:
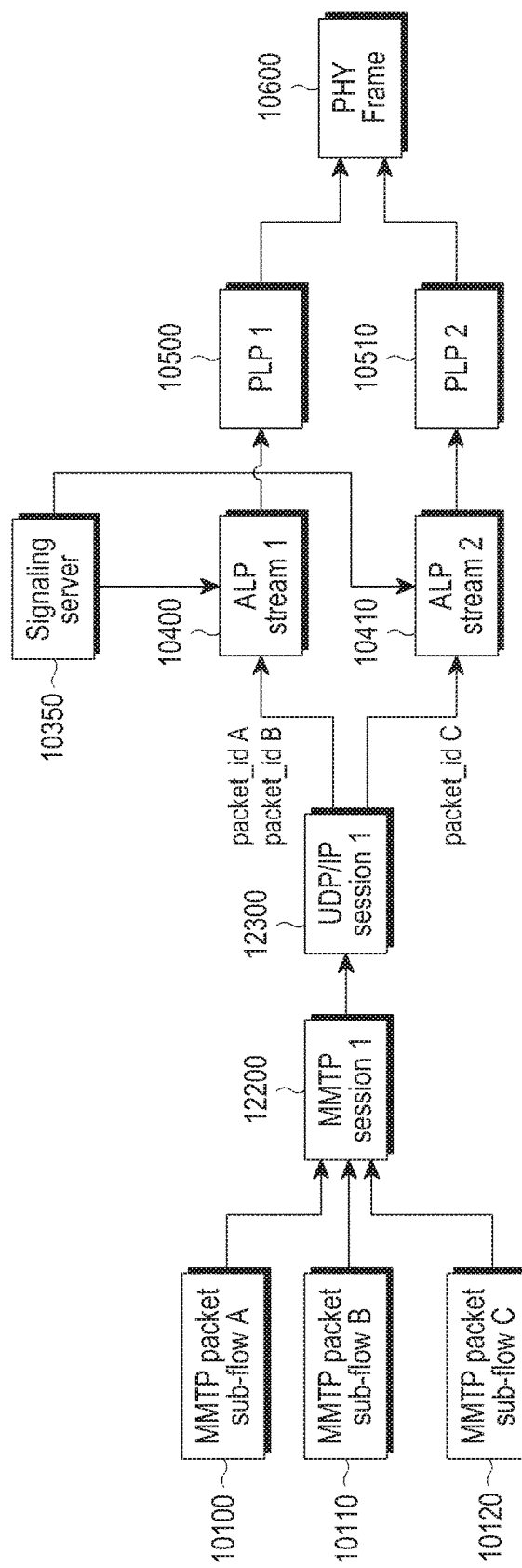
FIG. 12 schematically illustrates another example of a process of transmitting data in a transmitting apparatus in a multimedia system supporting a link layer protocol according to an embodiment of the present disclosure.

FIG. 12 schematically illustrates another example of a process of transmitting data in a transmitting apparatus in a multimedia system supporting a link layer protocol according to an embodiment of the present disclosure.

Referring to FIG. 12, a transmitting apparatus provides a service using two PLPs with different reliabilities, e.g., a PLP 1 10500 and a PLP 2 10510. It will be assumed that a reliability of the PLP 1 10500 is higher than a reliability of the PLP 2 10510. One service is provided using three MMTP packet sub-flows 10100, 10110, and 10120, e.g., an MMTP packet sub-flow A 10100, an MMTP packet sub-flow B 10110, and an MMTP packet sub-flow C 10120. An MMTP packet sub-flow denotes a flow of an MMTP packet which have the same packet_id. For example, in FIG. 12, it will be assumed that the MMTP packet sub-flow A 10100 includes a service-level signaling message, the MMTP packet sub-flow B 10110 includes voice data, and the MMTP packet sub-flow C 10120 includes image data. The service-level signaling message includes a list of assets configuring a service, and a characteristic and an address of each asset. In an embodiment of the present disclosure, the address of the asset includes a packet_id of an MMTP packet including the asset, and may include a destination IP address and a port number of a UDP/IP session through which the MMTP packet is transmitted if necessary. In an embodiment of the present disclosure, the address of the asset may include a PLP identifier (ID) of a PLP through which the MMTP packet is transmitted.

Referring to FIG. 12, the MMTP packet sub-flow A 10100, the MMTP packet sub-flow B 10110, and the MMTP packet sub-flow C 10120 are multiplexed as an MMTP session 1 12200, and the MMTP session 1 12200 is transferred to a UDP/IP session 1 12300. The UDP/IP packet transferred to the UDP/IP session 12300 and the output from the Signaling server 10350 are generated as an ALP packet, the ALP packet is de-multiplexed into an ALP stream 1 10400 and an ALP stream 2 10410, and the ALP stream 1 10400 and the ALP stream 2 10410 are transferred to a PLP 1 10500 and a PLP 2 10510, respectively.

The de-multiplexing process is performed based on information on a UDP/IP session and MMTP-level information. In an embodiment of the present disclosure, the de-multiplexing process is performed based on a packet_id of an MMTP packet. At this time, information related to mapping relation between an MMTP packet and an ALP_stream, i.e., mapping relation between a packet_id and an ALP_stream may be transferred through an additional information transfer process. In an embodiment of the present disclosure, the de-multiplexing may be performed through IP tunneling between an MMPT output device and a de-multiplexer. At this time, the MMPT output device transfers an MMTP packet to be mapped to an ALP stream 1 and an MMTP packet to be mapped to an ALP_stream 2 to the de-multiplexer through additional IP tunnels. At this time, information related to mapping relation between an IP packet and an ALP_stream, i.e., mapping relation between an IP tunnel and an ALP_stream may be transferred through an additional information transfer process.

The output from the Signaling server 10350 includes a signaling table or an UDP/IP packet which is generated by encapsulating the signaling table. The signaling table may be a PCT as described above, and the UDP/IP packet which is generated by encapsulating the signaling table may be a UDP/IP packet including an LLS table of ATSC 3.0. A PCT according to an embodiment of the present disclosure may be expressed as Table 13.

TABLE 13

| Syntax | Number of bits | Mnemonic |
|---|---|---|
| PLP_Configuration_Table( ) { | | |
|   signaling_type | 8 | uimsbf |
|   Reserved | 2 | '00' |
|   Num_PLP | 6 | uimsbf |
|   for(i=0;i<Num_PLP;i++) { | | |
|     PLP_ID | 8 | uimsbf |
|     Num_session | 8 | uimsbf |
|     for(j=0; i< Num_session; i++) { | | |
|       Src_IP_add | 32 | uimsbf |
|       Dst_IP_add | 32 | uimsbf |
|       Src_UDP_port | 16 | uimsbf |
|       Dst_UDP_port | 16 | uimsbf |
|       Protocol_id | 8 | uimsbf |
|       switch (Protocol_id) { | | |
|         case 0x01: | | |
|           num_sub_flow | 32 | uimsbf |
|           for(k=0;k<num_sub_flow) | | |
|           { | | |
|             Tsi | 32 | uimsbf |
|           } | | |
|         break; | | |
|         case: 0x02: | | |
|           num_sub_flow | 16 | uimsbf |
|           for(k=0;k<num_sub_flow) | | |
|           { | | |
|             packet_id | 16 | uimsbf |
|           } | | |
|         break; | | |
|         default: | | |
|           reserved | var | |
|       } | | |
|     } | | |
|   } | | |
| } | | |

In Table 13, a Protocol_id field may be expressed as Table 14.

TABLE 14

| Protocol | Meaning |
|---|---|
| 0 | Reserved |
| 1 | ROUTE |
| 2 | MMTP |
| other values | Reserved for future use |

If a value of the Protocol_id field is "1", it means that a corresponding protocol is a ROUTE, and if a value of the Protocol_id field is "2", it means that a corresponding protocol is an MMTP.

If the Protocol_id field is expressed as Table 14, a tsi in Table 13 indicates an identifier (ID) of an LCT channel configuring a ROUTE session, and a packet_id indicates an ID of an MMTP packet sub-flow configuring an MMTP session.

In an embodiment of the present disclosure, the PCT may be expressed as shown in Table 15.

TABLE 15

| Syntax | Number of bits | Mnemonic |
|---|---|---|
| PLP_Configuration_Table( ) { | | |
|   signaling_type | 8 | uimsbf |
|   Reserved | 2 | '00' |
|   Num_PLP | 6 | uimsbf |
|   for(i=0;i<Num_PLP;i++) { | | |
|     PLP_ID | 8 | uimsbf |
|     Num_session | 8 | uimsbf |
|     for(j=0; i< Num_session; i++) { | | |
|       Src_IP_add | 32 | uimsbf |
|       Dst_IP_add | 32 | uimsbf |
|       Src_UDP_port | 16 | uimsbf |
|       Dst_UDP_port | 16 | uimsbf |
|       Protocol_type | 8 | uimsbf |
|       switch (Protocol_type) { | | |
|         case 0x01: | | |
|           num_sub_flow | 8 | uimsbf |
|           for(k=0;k<num_sub_flow) { | | |
|             sub_flow_id | 8 | uimsbf |
|           } | | |
|         break; | | |
|         case: 0x02: | | |
|           num_sub_flow | 16 | uimsbf |
|           for(k=0;k<num_sub_flow) { | | |
|             sub_flow_id | 16 | Uimsbf |
|           } | | |
|         break; | | |
|         case: 0x04: | | |
|           num_sub_flow | 32 | uimsbf |
|           for(k=0;k<num_sub_flow) { | | |
|             sub_flow_id | 32 | uimsbf |
|           } | | |
|         break; | | |
|       } | | |
|     } | | |
|   } | | |
| } | | |

In Table 15, a Protocol_type field indicates an identifier (ID) used for identifying a sub-flow in a general upper layer protocol, and indicates, for example, a length in bytes.

In FIG. 12, the output from the Signaling server 10350 is transferred to all PLPs, however, the output from the Signaling server 10350 may be transferred to a specific PLP according to a type of a signaling. For example, all of the service-level signaling and the output from the Signaling server 10350 may be transferred to one PLP, and if a plurality of service providers use one RF signal, a signaling is configured for each service provider, and the configured signalings may be transmitted to different PLPs. A signaling table and a UDP/IP which is generated by encapsulating the signaling table among the output of the Signaling server 10350 may be transmitted through the same PLP or different PLPs.

A receiving apparatus which receives a signal transmitted as described in FIG. 12 may configure a channel map based on a process similar to a process as described in FIG. 11. At this time, information related to a location at a PLP-level may be includes in an SLT/SLS, a PCT, or both an SLT/SLS and a PCT.

Although FIG. 12 illustrates another example of a process of transmitting data in a transmitting apparatus in a multimedia system supporting a link layer protocol according to an embodiment of the present disclosure, various changes could be made to FIG. 12. For example, although shown as a series of operations, various operations in FIG. 12 could overlap, occur in parallel, occur in a different order, or occur multiple times.

Another example of a process of transmitting data in a transmitting apparatus in a multimedia system supporting a link layer protocol according to an embodiment of the present disclosure has been described with reference to FIG. 12, and a process of compressing a UDP/IP header in a multimedia system supporting a link layer protocol according to an embodiment of the present disclosure will be described with reference to FIG. 13.

Figure 13:
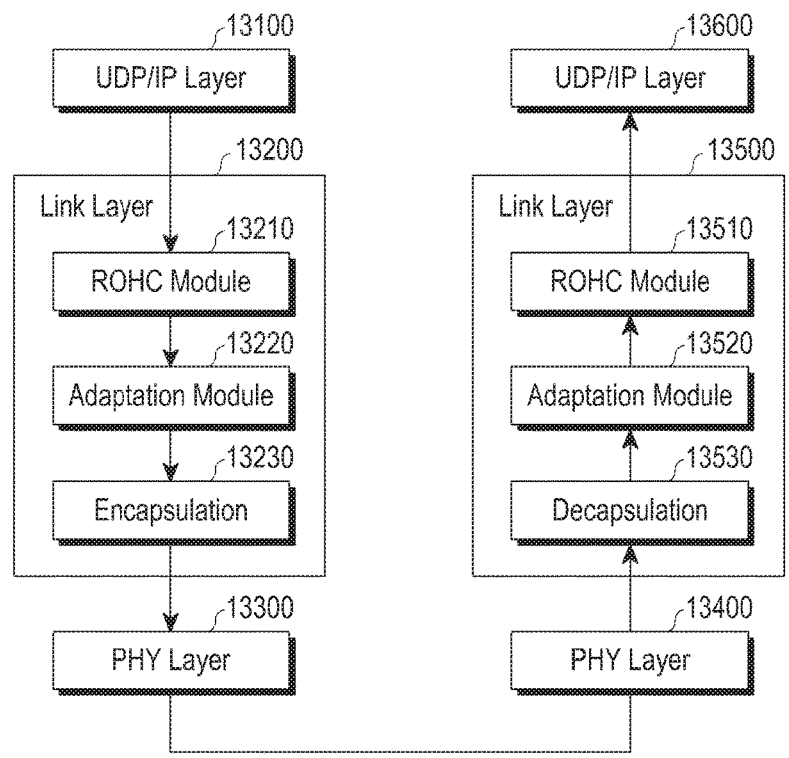
FIG. 13 schematically illustrates a process of compressing a user datagram protocol (UDP)/Internet protocol (IP) header in a multimedia system supporting a link layer protocol according to an embodiment of the present disclosure.

FIG. 13 schematically illustrates a process of compressing a UDP/IP header in a multimedia system supporting a link layer protocol according to an embodiment of the present disclosure.

Referring to FIG. 13, IP packets output from a UDP/IP layer 13100 included in a transmitting apparatus are encapsulated into an ALP packet in which a UDP/IP header is compressed in a link layer 13200 included in the transmitting apparatus, and the ALP packet is transferred to a physical layer 13300 included in the transmitting apparatus. At this time, information required for recovering the compressed UDP/IP header may be encapsulated into an additional ALP packet. The physical layer 13300 included in the transmitting apparatus converts input ALP packets into an RF signal to transmit the RF signal.

The RF signal transmitted in the physical layer 13300 included in the transmitting apparatus is transferred to a physical layer 13400 included in a receiving apparatus. The physical layer 13400 included in a receiving apparatus extracts an ALP packet from the received RF signal to transfer the extracted ALP packet to a link layer 13500 included in the receiving apparatus. The link layer 13500 included in the receiving apparatus extracts a UDP/IP packet from the ALP packet to transfer the UDP/IP packet to a UDP/IP layer 13600 included in the receiving apparatus.

Meanwhile, a process of compressing a UDP/IP header performed in the link layer 13200 included in the transmitting apparatus will be described below.

A UDP/IP header included in a UDP/IP packet output from the UDP/IP layer 13100 included in the transmitting apparatus is compressed in an ROHC module 13210 included in the transmitting apparatus. The compressed UDP/IP header includes information for recovering the UDP/IP header in the receiving apparatus. The information for recovering the UDP/IP header includes a Context_ID (CID), a static chain, and a dynamic chain. The ROHC module 13210 included in the transmitting apparatus inputs IP packets corresponding to one or more UDP/IP sessions, and compresses the IP packets to output the compressed one or more packet flows. If the ROHC module 13210 included in the transmitting apparatus generates a plurality of compressed packet flows, each of the plurality of compressed packet flows may be identified based on a CID of a compressed packet header. Here, a UDP/IP session may be mapped to a compressed packet flow one-to-one.

Meanwhile, an adaptation module 13220 included in the transmitting apparatus may configure an additional link layer signaling by extracting at least one of a static chain and a dynamic chain from a compressed UDP/IP header included in a packet included in the compressed packet flow from the ROHC module 13210, and the extracted information may be deleted from the compressed UDP/IP header. The link layer signaling may follow an ROHC-U_description_table (RDT) format as described in Table 11. That is, the header of the compressed UDP/IP packet output from the adaptation module 13220 included in the transmitting apparatus may have a format different from a format of a header of a corresponding input packet. An encapsulation module 13230 included in the transmitting apparatus encapsulates a packet output from the adaptation module 13220 into an ALP packet. A value of a Packet_Type field included in a header of the ALP packet is encoded thereby the value of a Packet_Type field may be set to a value corresponding to a payload format of the ALP packet. In a case that an encoding scheme as described in Table 2 is used, a value of the Packet_Type field may be set to '001' if a payload of an ALP packet includes a compressed UDP/IP packet, and may be set to '100' if a payload of an ALP packet includes a link layer signaling.

A process of recovering a UDP/IP header performed in the link layer 13500 included in the receiving apparatus will be described below.

A decapsulation module 13530 included in the receiving apparatus extracts data from a payload included in an ALP packet output from the physical layer 13400 included in the receiving apparatus. A value of a Packet_Type field included in a header of the ALP packet may be varied according to a payload format of the ALP packet. In a case that the encoding scheme as described in Table 2 is used, if a value of the Packet_Type field is '001', it means that a payload of an ALP packet is a compressed UDP/IP packet, and if a value of the Packet_Type field is '100', it means that a payload of an ALP packet is a link layer signaling. The adaptation module 13520 included in the receiving apparatus performs the reverse of a process performed in the adaptation module 13220 included in the transmitting apparatus based on an input UDP/IP packet and link layer signaling. The reverse process may include a process of recovering an original header from a compressed UDP/IP header in which at least one of a static chain and a dynamic chain is deleted based on the static chain and the dynamic chain of the link layer signaling. If there is no error on a channel, an output from the ROHC module 13210 included in the transmitting apparatus is identical to an input to the ROHC module 13510 included in the receiving apparatus. In an embodiment of the present disclosure, the adaptation module 13520 included in the receiving apparatus may extract information required for recovery from a link layer signaling without completely recovering output from the ROHC module 13210 included in the transmitting apparatus, and transfer the extracted information to the ROHC module 13510 included in the receiving apparatus.

Although FIG. 13 illustrates a process of compressing a UDP/IP header in a multimedia system supporting a link layer protocol according to an embodiment of the present disclosure, various changes could be made to FIG. 13. For example, although shown as a series of operations, various operations in FIG. 13 could overlap, occur in parallel, occur in a different order, or occur multiple times.

A process of compressing a UDP/IP header in a multimedia system supporting a link layer protocol according to an embodiment of the present disclosure has been described with reference to FIG. 13, and a process of recovering a UDP/IP header in a receiving apparatus in a multimedia system supporting a link layer protocol according to an embodiment of the present disclosure will be described with reference to FIG. 14.

Figure 14:
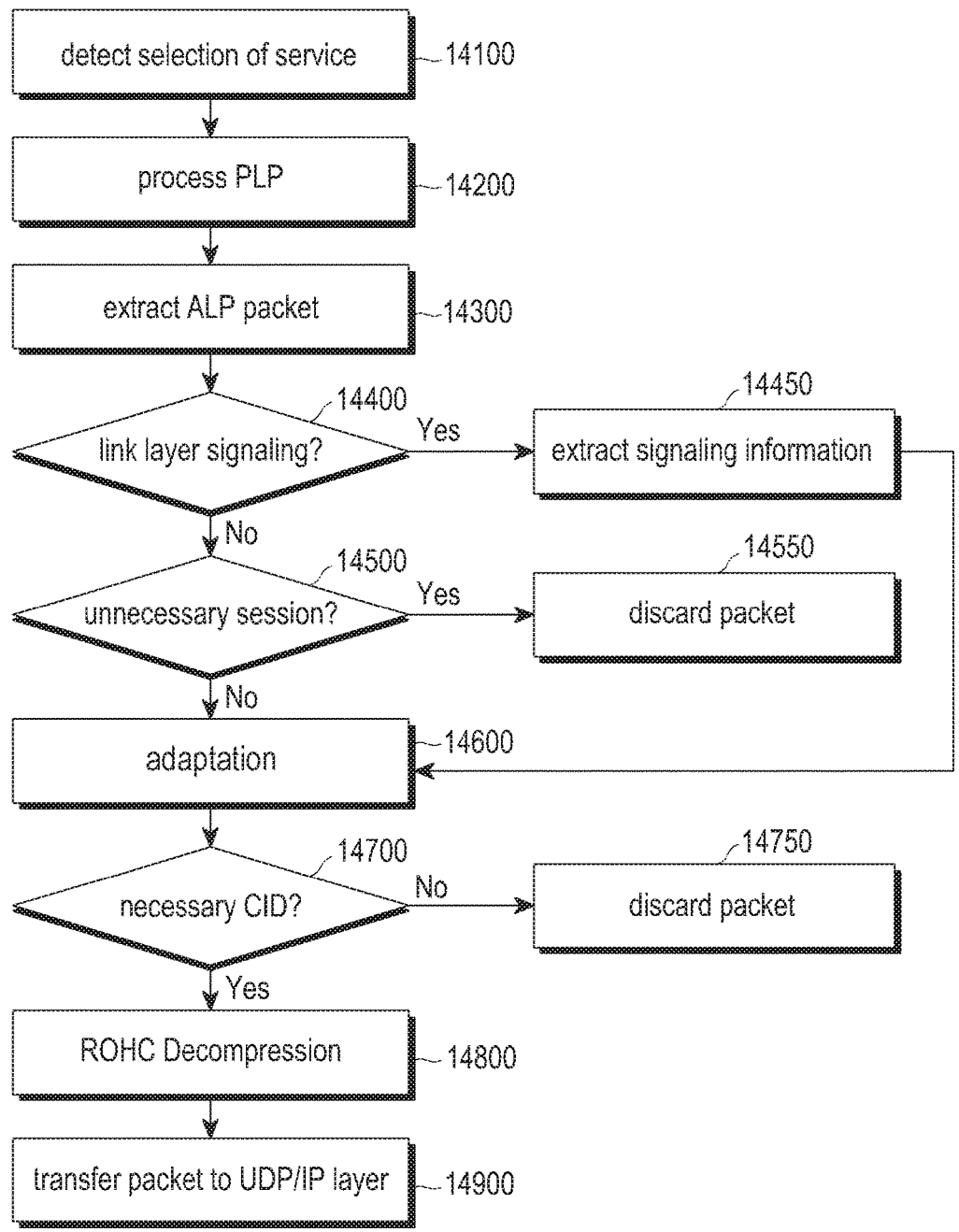
FIG. 14 schematically illustrates a process of recovering a UDP/IP header in a receiving apparatus in a multimedia system supporting a link layer protocol according to an embodiment of the present disclosure.

FIG. 14 schematically illustrates a process of recovering a UDP/IP header in a receiving apparatus in a multimedia system supporting a link layer protocol according to an embodiment of the present disclosure.

Referring to FIG. 14, it will be assumed that information related to a media transmission location for service presentation is acquired and stored based on a process as described in FIG. 11. For example, it will be assumed that a receiving apparatus has the following information.
(1) Information related to a UDP/IP session through a media is transmitted
(2) PLP identifier of a PLP through a UDP/IP session is transmitted
(3) Sub-stream identifier of a sub-stream corresponding to a UDP/IP session
(4) CID corresponding to a UDP/IP session The sub-stream identifier (SID) of the sub-stream corresponding to the UDP/IP session may be optionally allocated, and the CID corresponding to the UDP/IP session be optionally allocated if a compression scheme is applied to a UDP/IP header. In FIG. 14, it will be assumed that a header compression scheme is applied to all UDP/IP sessions.

Firstly, a receiving apparatus detects that a user selects a service at operation 14100. The receiving apparatus processes a PLP through the service is transmitted at operation 14200. The receiving apparatus extracts an ALP packet at operation 14300. As described above, the extracted ALP packet includes a compressed UDP/IP packet or a link layer signaling as a payload. The receiving apparatus determines whether the ALP packet includes a link layer signaling at operation 14400. Here, whether the ALP packet includes the link layer signaling may be determined based on a value of a Packet_Type field included in the ALP packet header.

If the ALP packet includes the link layer signaling, the receiving apparatus extracts a link layer signaling included in the ALP packet, i.e., a link layer signaling included in the payload included in the ALP packet at operation 14450.

If the ALP packet does not include the link layer signaling, the receiving apparatus proceeds to operation 14500. Here, a case that the ALP packet does not include the link layer signaling means that the payload included in the ALP packet includes a compressed UDP/IP packet. So, the receiving apparatus determines whether there is a UDP/IP session unnecessary for service presentation at operation 14500. If there is the UDP/IP session unnecessary for the service presentation, the receiving apparatus discards ALP packets with a sub-stream identifier (SID) which corresponds to the UDP/IP session unnecessary for the service presentation at operation 14550.

If there is no UDP/IP session unnecessary for the service presentation, the receiving apparatus performs an adaptation operation on the payload extracted from the ALP packet at operation 14600. Here, a header of the compressed UDP/IP packet after the adaptation operation includes a CID. The receiving apparatus determines whether the CID is a CID necessary for the service presentation at operation 14700. If the CID is a CID which corresponds to a UDP/IP session unnecessary for the service presentation, the receiving apparatus discards packets with a CID which corresponds to the UDP/IP session unnecessary for the service presentation at operation 14750.

If the CID is the CID which corresponds to the UDP/IP session necessary for the service presentation, the receiving apparatus performs an ROHC decompression operation on packets with a CID which corresponds to the UDP/IP session necessary for the service presentation at operation 14800. The receiving apparatus transfers a recovered packet after the ROHC decompression operation to a UDP/IP layer at operation 14900.

Although FIG. 14 illustrates a process of recovering a UDP/IP header in a receiving apparatus in a multimedia system supporting a link layer protocol according to an embodiment of the present disclosure, various changes could be made to FIG. 14. For example, although shown as a series of operations, various operations in FIG. 14 could overlap, occur in parallel, occur in a different order, or occur multiple times.

As described above, according to various embodiments of the present disclosure, data processing efficiency may be increased by filtering a packet in a link layer.

A process of recovering a UDP/IP header in a receiving apparatus in a multimedia system supporting a link layer protocol according to an embodiment of the present disclosure has been described with reference to FIG. 14, and an inner structure of a transmitting apparatus in a multimedia system according to an embodiment of the present disclosure will be described with reference to FIG. 15.

Figure 15:
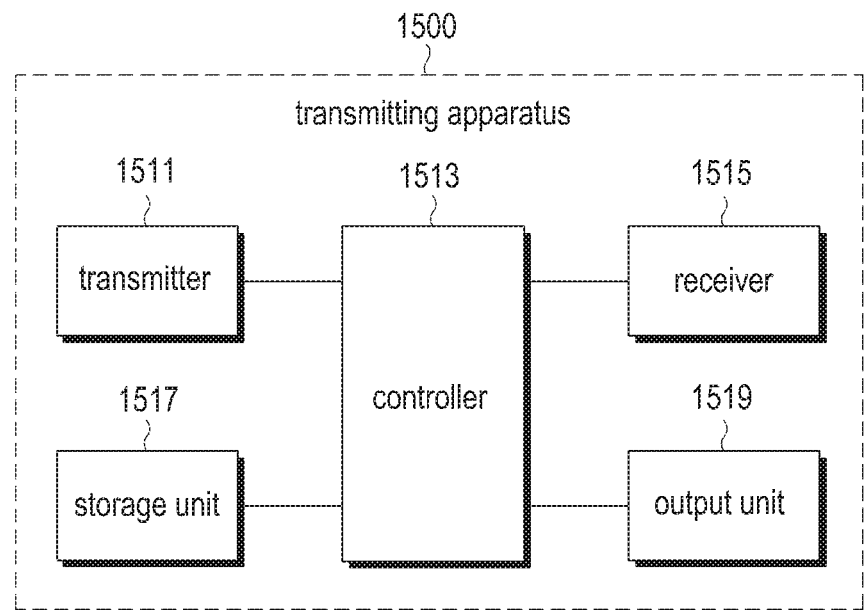
FIG. 15 schematically illustrates an inner structure of a transmitting apparatus in a multimedia system according to an embodiment of the present disclosure.

FIG. 15 schematically illustrates an inner structure of a transmitting apparatus in a multimedia system according to an embodiment of the present disclosure.

Referring to FIG. 15, a transmitting apparatus 1500 may be a service provider, and/or the like.

The transmitting apparatus 1500 includes a transmitter 1511, a controller 1513, a receiver 1515, a storage (memory) unit 1517, and an output unit 1519. The controller 1513 includes at least one processor.

The controller 1513 controls the overall operation of the transmitting apparatus 1500. More particularly, the controller 1513 controls an operation related to an operation of transmitting and receiving a signal in a multimedia system according to an embodiment of the present disclosure, e.g., an operation of transmitting and receiving information related to a link layer packet carrying a plurality of sub-streams. The operation related to the operation of transmitting and receiving the information related to the link layer packet carrying the plurality of sub-streams has been described with reference to FIGS. 1 to 14 and Tables 1 to 15, and a detailed description thereof will be omitted herein.

The transmitter 1511 transmits various signals and various messages to other entities, e.g., a receiving apparatus and the like included in the multimedia system under a control of the controller 1513. For example, the receiving apparatus may be a terminal and/or the like. The various signals and various messages transmitted in the transmitter 1511 have been described with reference to FIGS. 1 to 14 and Tables 1 to 15, and a detailed description thereof will be omitted herein.

The receiver 1515 receives various signals and various messages from other entities, e.g., a receiving apparatus and the like included in the multimedia system under a control of the controller 1513. The various signals and various messages received in the receiver 1515 have been described with reference to FIGS. 1 to 14 and Tables 1 to 15, and a detailed description thereof will be omitted herein.

The storage unit 1517 stores various programs, various data, and the like related to the operation related to the operation of transmitting and receiving the information related to the link layer packet carrying the plurality of sub-streams performed in the multimedia system according to an embodiment of the present disclosure under a control of the controller 1513. The storage unit 1517 stores various signals and various messages which are received by the receiver 1515 from the other entities.

The output unit 1519 outputs various signals and various messages related to the operation related to the operation of transmitting and receiving the information related to the link layer packet carrying the plurality of sub-streams performed in the multimedia system according to an embodiment of the present disclosure under a control of the controller 1513. The various signals and various messages output by the output unit 1519 have been described with reference to FIGS. 1 to 14 and Tables 1 to 15, and a detailed description thereof will be omitted herein.

While the transmitter 1511, the controller 1513, the receiver 1515, the storage unit 1517, and the output unit 1519 are described in the transmitting apparatus 1500 as separate units, it is to be understood that this is merely for convenience of description. In other words, two or more of the transmitter 1511, the controller 1513, the receiver 1515, the storage unit 1517, and the output unit 1519 may be incorporated into a single unit.

The transmitting apparatus 1500 may be implemented with at least one processor.

An inner structure of a transmitting apparatus in a multimedia system according to an embodiment of the present disclosure has been described with reference to FIG. 15, and an inner structure of a receiving apparatus in a multimedia system according to an embodiment of the present disclosure will be described with reference to FIG. 16.

Figure 16:
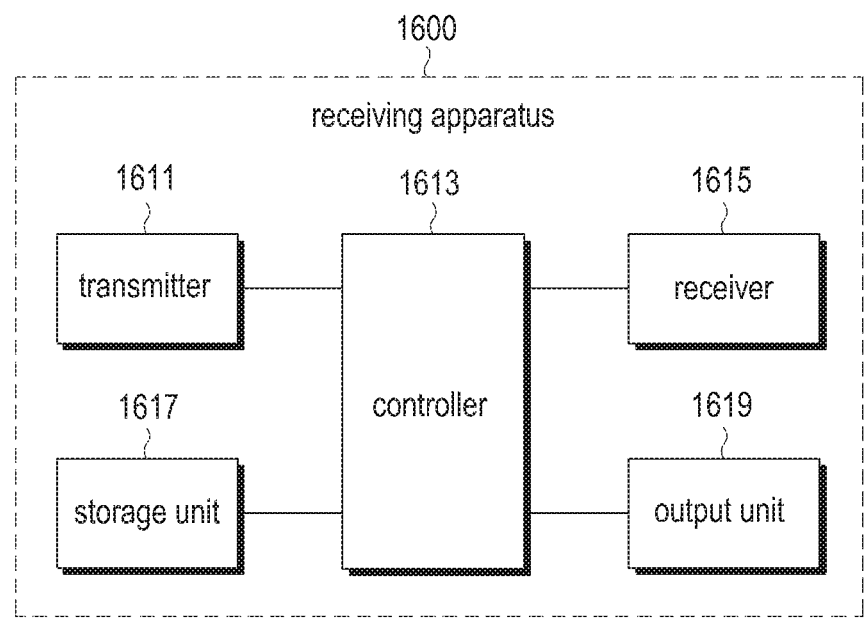
FIG. 16 schematically illustrates an inner structure of a receiving apparatus in a multimedia system according to an embodiment of the present disclosure.

FIG. 16 schematically illustrates an inner structure of a receiving apparatus in a multimedia system according to an embodiment of the present disclosure.

Referring to FIG. 16, a receiving apparatus 1600 may be a terminal, and/or the like.

The receiving apparatus 1600 includes a transmitter 1611, a controller 1613, a receiver 1615, a storage unit 1617, and an output unit 1619. The controller 1613 includes at least one processor.

The controller 1613 controls the overall operation of the receiving apparatus 1600. More particularly, the controller 1613 controls an operation related to an operation of transmitting and receiving a signal in a multimedia system according to an embodiment of the present disclosure, e.g., an operation of transmitting and receiving information related to a link layer packet carrying a plurality of sub-streams. The operation related to the operation of transmitting and receiving the information related to the link layer packet carrying the plurality of sub-streams has been described with reference to FIGS. 1 to 14 and Tables 1 to 15, and a detailed description thereof will be omitted herein.

The transmitter 1611 transmits various signals and various messages to other entities, e.g., a transmitting apparatus and the like included in the multimedia system under a control of the controller 1613. For example, the transmitting apparatus may be a service provider and/or the like. The various signals and various messages transmitted in the transmitter 1611 have been described with reference to FIGS. 1 to 14 and Tables 1 to 15, and a detailed description thereof will be omitted herein.

The receiver 1615 receives various signals and various messages from other entities, e.g., a transmitting apparatus and the like included in the multimedia system under a control of the controller 1613. The various signals and various messages received in the receiver 1615 have been described with reference to FIGS. 1 to 14 and Tables 1 to 15, and a detailed description thereof will be omitted herein.

The storage unit 1617 stores various programs, various data, and the like related to the operation related to the operation of transmitting and receiving the information related to the link layer packet carrying the plurality of sub-streams performed in the multimedia system according to an embodiment of the present disclosure under a control of the controller 1613. The storage unit 1617 stores various signals and various messages which are received by the receiver 1615 from the other entities.

The output unit 1619 outputs various signals and various messages related to the operation related to the operation of transmitting and receiving the information related to the link layer packet carrying the plurality of sub-streams performed in the multimedia system according to an embodiment of the present disclosure under a control of the controller 1613. The various signals and various messages output by the output unit 1619 have been described with reference to FIGS. 1 to 14 and Tables 1 to 15, and a detailed description thereof will be omitted herein.

While the transmitter 1611, the controller 1613, the receiver 1615, the storage unit 1617, and the output unit 1619 are described in the receiving apparatus 1600 as separate units, it is to be understood that this is merely for convenience of description. In other words, two or more of the transmitter 1611, the controller 1613, the receiver 1615, the storage unit 1617, and the output unit 1619 may be incorporated into a single unit.

The receiving apparatus 1600 may be implemented with at least one processor. Further, the transmitting apparatus 1500 and the receiving apparatus 1600 may be combined to form a transceiver.

An operating method of a transmitting apparatus proposed in an embodiment of the present disclosure includes a process for generating a link layer packet including a header and a payload which correspond to an input stream, a process for generating a physical layer frame including the link layer packet, a process for processing the generated physical layer frame based on a preset scheme, and a process for transmitting the processed physical layer frame. The payload may have a format which is the same as the input stream, a format which is generated by changing the format of the input stream, or a format which is unique according to a scheme of generating the link layer packet. The link layer packet generator may generate an additional link layer packet including information for controlling a receiver including a link layer.

A receiving apparatus proposed in an embodiment of the present disclosure includes a receiver for receiving a physical layer frame including data that an input stream is mapped to at least one signal processing path, and a processor for extracting a header from a link layer packet included in the physical layer frame and processing a payload based on the extracted header and a preset scheme. The payload may have a format which is the same as the input stream, a format which is generated by changing the format of the input stream, or a format which is unique according to a scheme of generating the link layer packet. A link layer packet generator of generating the link layer packet may generate an additional link layer packet including information for controlling a receiver including a link layer.

A receiving apparatus proposed in an embodiment of the present disclosure includes a receiver for receiving a physical layer frame including data that an input stream is mapped to at least one signal processing path, and a processor for extracting a header from a link layer packet included in the physical layer frame and processing a payload based on the extracted header and a preset scheme. The payload may have a format which is the same as the input stream, a format which is generated by changing the format of the input stream, or a format which is unique according to a scheme of generating the link layer packet. The payload may include data which is processed on a link layer and to be used for controlling a receiver including the link layer as well as data to be delivered to an upper layer.

An operating method of a receiving apparatus proposed in an embodiment of the present disclosure includes a process for receiving a physical layer frame including data that an input stream is mapped to at least one signal processing path, and a process for extracting a header from a link layer packet included in the physical layer frame and processing a payload based on the extracted header and a preset scheme. The payload may have a format which is the same as the input stream, a format which is generated by changing the format of the input stream, or a format which is unique according to a scheme of generating the link layer packet. The payload may include data which is processed on a link layer and to be used for controlling a receiver including the link layer as well as data to be delivered to an upper layer.

As is apparent from the foregoing description, an embodiment of the present disclosure enables to transmit and receive a signal in a multimedia system.

An embodiment of the present disclosure enables to transmit and receive a signal in a multimedia system supporting a link layer protocol.

An embodiment of the present disclosure enables to transmit and receive information related to a sub-stream included in a link layer packet in a multimedia system supporting a link layer protocol.

An embodiment of the present disclosure enables to transmit and receive information related to a link layer packet carrying a plurality of sub-streams in a multimedia system supporting a link layer protocol.

An embodiment of the present disclosure enables to effectively transmit and receive various types of services in a multimedia system supporting a link layer protocol.

An embodiment of the present disclosure enables to filter a sub-stream in a link layer packet thereby increasing data processing efficiency in a multimedia system supporting a link layer protocol.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller (including at least one processor) and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller (including at least one processor) for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operating method of a transmitting apparatus in a broadcasting system, the operating method comprising:
   identifying at least one network layer packet;
   generating a link layer packet based on the at least one network layer packet wherein the link layer packet comprises a header and a payload, the header including a basic header; and
   transmitting the link layer packet,
   wherein the basic header includes packet type information indicating a type of the at least one network layer packet, configuration information indicating whether the link layer packet includes a single network layer packet, and identification information indicating whether an additional header following the basic header is present.

2. The operating method of claim 1,
   wherein the header further comprises a header extension,
   wherein the identification information includes information indicating whether the link layer packet includes a single network layer packet are included in the base header, and
   wherein the header extension is information indicating an identifier related to the at least one network layer packet.

3. The operating method of claim 2, wherein the additional header includes information indicating whether the information indicating the identifier related to the at least one network layer packet is present.

4. The operating method of claim 3,
   wherein the base header further includes
   the payload carries a segment of the at least one network layer packet.

5. The operating method of claim 4, wherein the additional header includes information indicating an order of the segment carried by the link layer packet and information indicating whether the segment included in the payload is a last segment of the at least one network layer packet.

6. The operating method of claim 3,
wherein the base header further includes
the payload carries at least two network layer packets.

7. The operating method of claim 6, wherein the additional header includes information indicating a number of the at least two network layer packets included in the link layer packet and information indicating a length of each of the at least two network layer packets.

8. The operating method of claim 1, wherein, if a plurality of sessions are included in a physical layer channel signal, the information indicating the identifier related to the at least one network layer packet has a mapping relation with information related to a session which is carried by the link layer packet among the plurality of sessions.

9. The operating method of claim 8, wherein, if the plurality of sessions includes Internet protocol (IP) sessions, the information related to the IP session which is carried by the link layer packet among the plurality of sessions includes a source IP address, a destination IP address, a user datagram protocol (UDP) port number, and a destination UDP port number for the IP session which is carried by the link layer packet.

10. The operating method of claim 8, wherein, if the plurality of sessions includes IP sessions, the information related to the session which is carried by the link layer packet among the plurality of sessions includes information indicating whether the information indicating the identifier related to the at least one network layer packet is included in the header and information indicating whether a header compression scheme is applied.

11. The operating method of claim 10, wherein the information related to the session which is carried by the link layer packet among the plurality of sessions includes the information indicating the identifier related to the at least one network layer packet and a context identifier of an IP stream to which the header compression scheme is applied.

12. The operating method of claim 11, wherein the context identifier is generated based on robust header compression (ROHC).

13. The operating method of claim 8, wherein the information related to the session which is carried by the link layer packet among the plurality of sessions includes information indicating a number of the plurality of sessions.

14. An operating method of a transmitting apparatus in a multimedia system, the operating method comprising:
generating a link layer packet including a header including information related to a first session among a plurality of sessions if the plurality of sessions are included in a physical layer channel signal; and
transmitting the link layer packet,
wherein, if the plurality of sessions includes internet protocol (IP) sessions, the information related to the first session includes an identifier of the first session and a context identifier of an IP stream to which a header compression scheme is applied.

15. The operating method of claim 14, wherein the context identifier is generated based on robust header compression (ROHC).

16. The operating method of claim 14, wherein the information related to the first session includes a source IP address, a destination IP address, a user datagram protocol (UDP) port number, and a destination UDP port number for the first session.

17. The operating method of claim 14, wherein the information related to the first session includes information indicating whether an identifier of the first session is included in the header and information indicating whether a header compression scheme is applied.

* * * * *